United States Patent [19]

Calle et al.

[11] 4,075,686
[45] Feb. 21, 1978

[54] INPUT/OUTPUT CACHE SYSTEM INCLUDING BYPASS CAPABILITY

[75] Inventors: Jaime Calle, Glendale; Lawrence W. Chelberg, Phoenix, both of Ariz.

[73] Assignee: Honeywell Information Systems Inc., Waltham, Mass.

[21] Appl. No.: 755,871

[22] Filed: Dec. 30, 1976

[51] Int. Cl.² .............................................. G06F 13/00
[52] U.S. Cl. ................................................. 364/200
[58] Field of Search ............................... 364/200 MS

[56] References Cited

U.S. PATENT DOCUMENTS

| | | | |
|---|---|---|---|
| 3,422,401 | 1/1969 | Lucking | 364/200 |
| 3,569,938 | 12/1967 | Eden et al. | 364/200 |
| 3,588,829 | 6/1971 | Boland et al. | 364/200 |
| 3,588,839 | 6/1971 | Belady et al. | 364/200 |
| 3,670,307 | 6/1972 | Arnold et al. | 364/200 |
| 3,670,309 | 6/1972 | Amdahl et al. | 364/200 |
| 3,735,360 | 5/1973 | Anderson et al. | 364/200 |
| 3,845,474 | 10/1974 | Lange | 364/200 |

*Primary Examiner*—Harvey E. Springborn
*Attorney, Agent, or Firm*—Faith F. Driscoll; Nicholas Prasinos; Ronald T. Reiling

[57] ABSTRACT

A local memory of an input/output system includes a cache store and a backing store. The system includes a plurality of command modules. The cache store provides fast access to blocks of information previously fetched from the backing store in response to memory commands generated by any one of a plurality of command modules during both data transfer and data processing operations. Each memory command applied to the memory unit incudes a predetermined bit which is coded to designate when the information requested from the local memory unit is to be written into the cache store. The local memory unit includes aparatus operative in response to each memory command to enable the command module to bypass selectively the cache store in accordance with the coding of the predetermined bit thereby enabling the command modules to execute operations more expeditiously during the performance of input/output data transfer operations.

35 Claims, 16 Drawing Figures

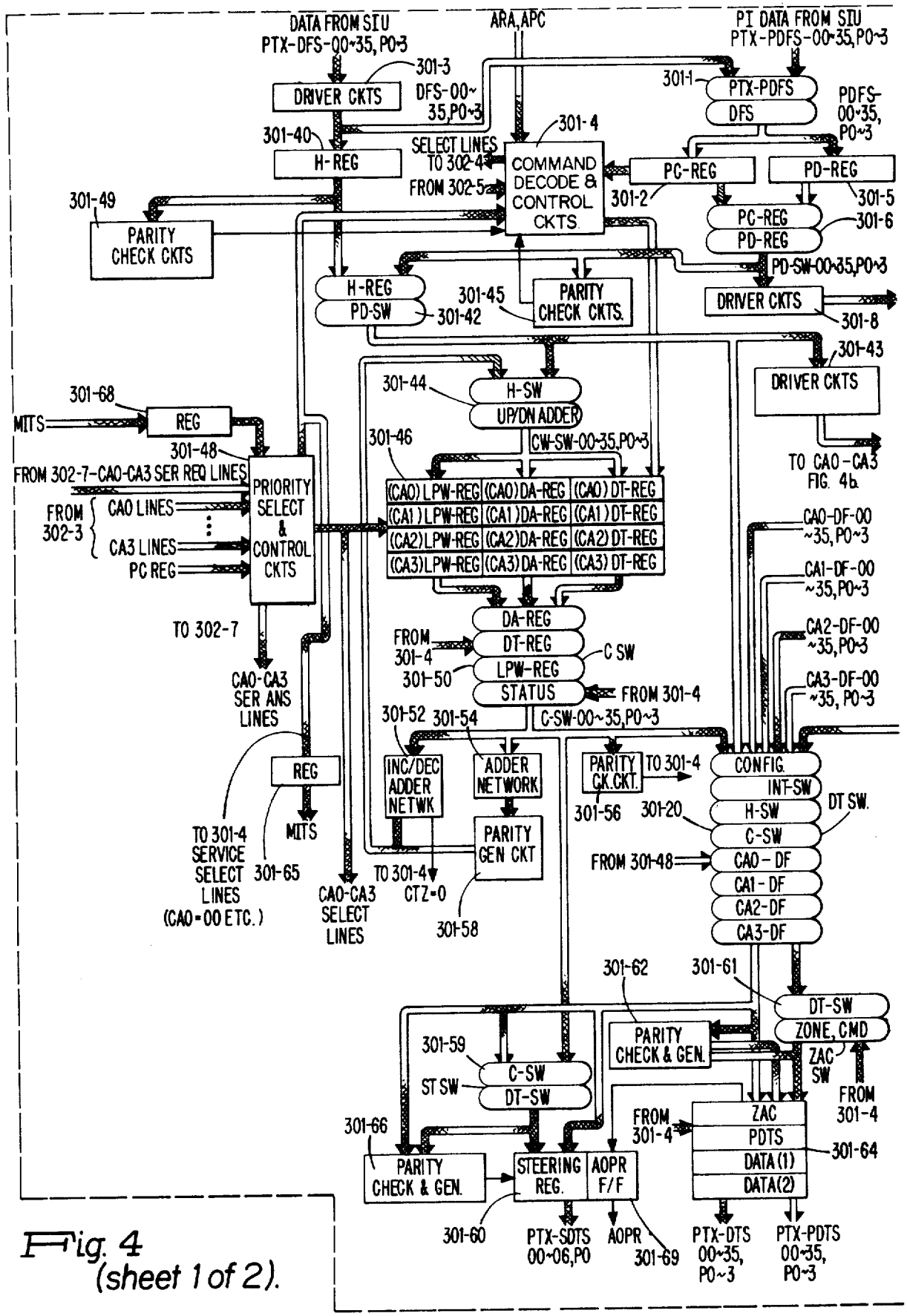
Fig. 4 (sheet 1 of 2).

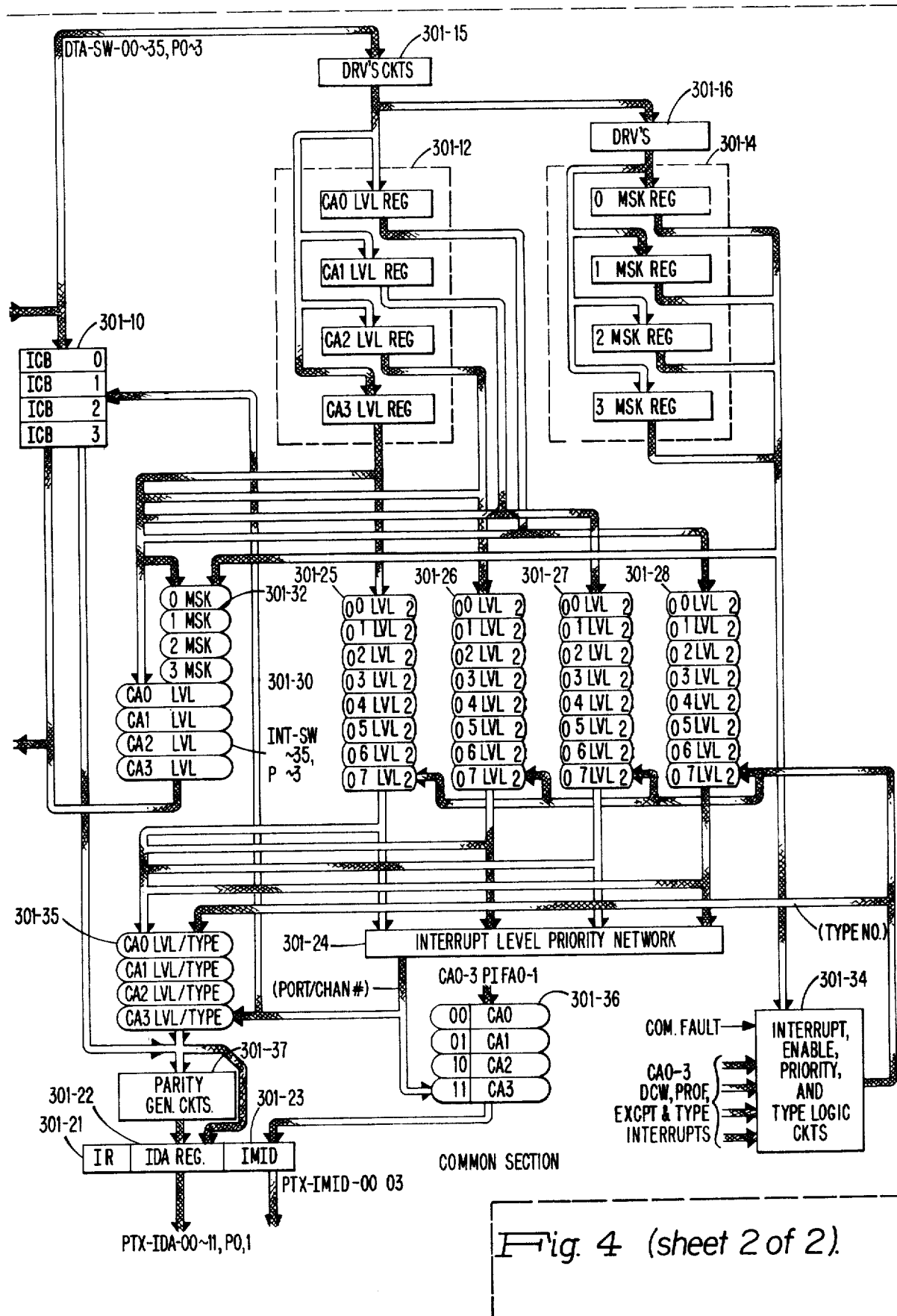
Fig. 4 (sheet 2 of 2).

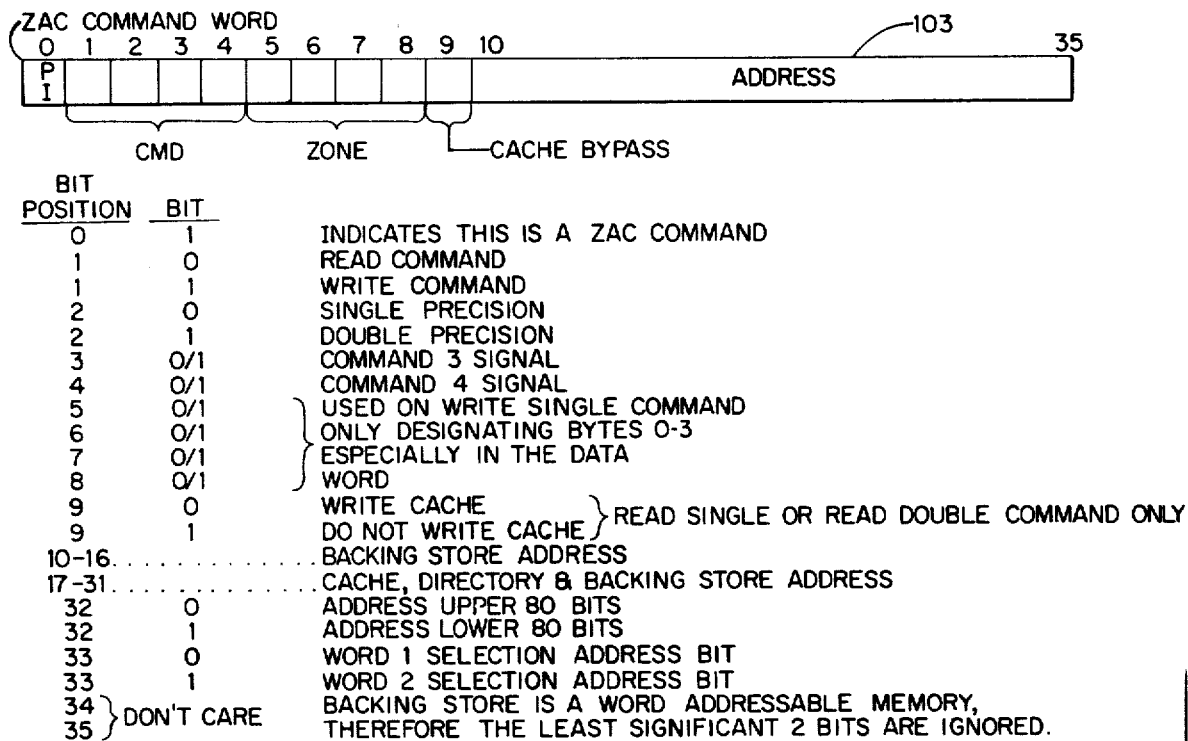
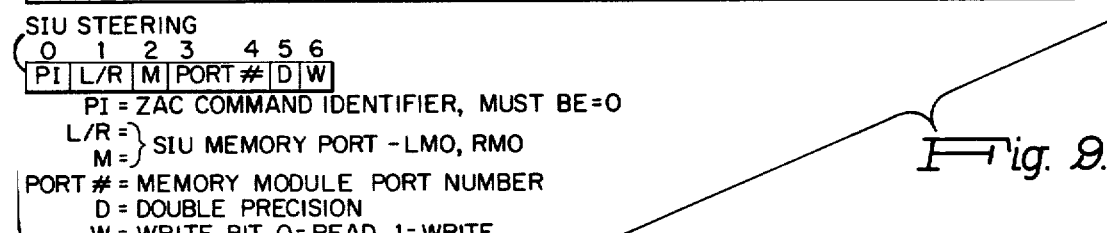
Fig. 9.
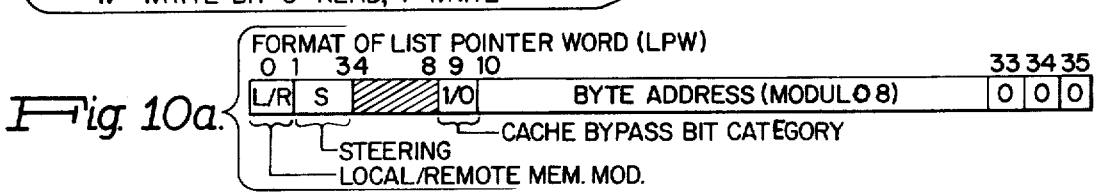
Fig. 10a.
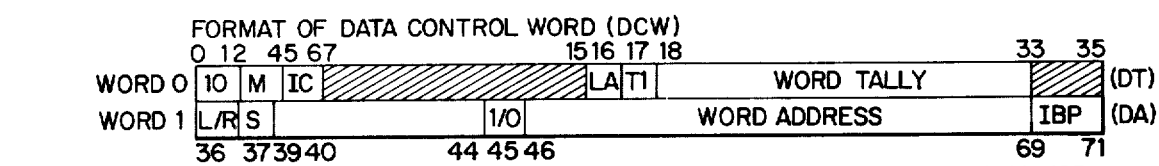
Fig. 10b.

INPUT/OUTPUT CACHE SYSTEM INCLUDING BYPASS CAPABILITY

RELATED APPLICATIONS

1. "Input/Output Processing System Utilizing Locked Processors" invented by John M. Woods, Marion G. Porter, Donald V. Mills, Edward F. Weller, III, Garvin W. Patterson and Earnest M. Monahan, Ser. No. 741,632, filed on 11/15/76 and assigned to the same assignee as named herein.
2. "Multiplexer Security System" invented by Jaime Calle and V. Michael Griswold, Ser. No. 591,563, filed on June 30, 1975 and assigned to the same assignee as named herein.
3. "Pathfinder Microprogram Control System" invented by G. Wesley Patterson and Marion G. Porter, Ser. No. 562,363, filed on Mar. 26, 1975 and assigned to the same assignee as named herein.
4. "Memory Access System" invented by Edward F. Weller, III and Marion G. Porter, Ser. No. 742,814, filed on 11/18/76 and assigned to the same assignee as named herein.

BACKGROUND OF THE INVENTION

1. Field of Use

The present invention relates to data processing systems and in particular to systems which include cache memory stores.

2. Prior Art

In some prior art systems, the central processing unit includes a register for controlling the modes of operation. Normally, the register is loaded by a special instruction which is able to turn the cache store on and off which in effect bypasses the store.

In such systems, it therefore becomes necessary to first place the central processing unit in a particular mode which then allows bypassing of the cache memory store. Obvious disadvantages include the additional overhead processing. Moreover, the arrangement is not suitable for systems which can have more than one processing unit access the cache store (e.g. multiprocessing system).

Another prior art system employs a segment memory system which enables, through the use of segment descriptor words, the manner in which segments are to be handled (access attributes). Included in the segment descriptor words are bits which cause the address unit to inhibit the cache from making any successful address comparisons. This enables some segments to have words sorted in the cache store and the cache store to be bypassed by other segments.

In such an arrangement, it is normally required that segments associated with input/output operations are prevented from entering the central processing unit's cache store (operates without cache) in that this could cause the updating of words in main memory which would not be detected.

While this arrangement is more suitable for multiprocessing systems, it still has the disadvantages of overhead expended in establishing which segments are permitting access to the cache store particularly where the segments are to be shared. Also, this places additional restrictions upon main memory addresses and complicates memory management.

Accordingly, it is a primary object of the present invention to provide an improved arrangement for bypassing a cache store.

It is a further object of the present invention to provide a cache store in which any area may be selectively accessed by any one of a number of command modules.

SUMMARY OF THE INVENTION

The above and other objects are achieved in a preferred embodiment of the present invention which comprises an input/output system which includes a number of command modules and a local memory module. The local memory module includes a backing store and a cache store. The cache store provides fast access to blocks of information previously fetched from the backing store. The system of the preferred embodiment further includes a system interface unit which includes a plurality of ports, each connected to a different one of the modules.

Each memory read command applied to the local memory module includes a predetermined bit which is coded to designate when the information requested from the backing store is to be also written into the cache store. The local memory module further includes control apparatus which is operative in response to each read memory command to enable the information being requested from the backing store to bypass selectively the cache store in accordance with the state of the predetermined command bit.

In the preferred embodiment, the command modules include at least one input/output processor and a multiplexer module. Generally, the cache store is used by the processor which is operative to have set the predetermined bit of each read memory command to a predetermined state. This conditions the control apparatus to store in the cache store blocks of information including the information requested from backing store by the processor. During input/output data transfers, the multiplexer module presents memory commands which do not have the predetermined bit set to the predetermined state. Hence, the control apparatus transfer the input/output information requested from backing store without storing it in the cache store. This prevents the multiplexer module from overwriting information previously stored in the cache store by the processor with input/output information. However, when the requested input/output information already resides in the cache store, the control apparatus transfers the requested input/output information from the cache store resulting in a faster memory cycle. In this manner, the processor maintains proper control of the cache store even though access to the same local memory module is shared with other command modules (e.g. multiplexer modules). The result is a more expeditious control of input/output operations.

However, there may be certain situations where the processor does not want information requested from backing store to be stored in the cache store. Similarly, there may also be instances where the system wants the input/output information being requested from backing store by the multiplexer module to also be written into the cache store.

In the case of the processor, the above is desirable where the processor issues a read command for obtaining a disk seek address to be stored in a processor working register. Since the information being requested from backing store is not intended to be again referenced from memory, the processor is operative to present a memory command in which the predetermined bit is in a state other than the predetermined state.

As concerns the multiplexer module, the system normally has constructed tables in backing store which the multiplexer module references during the execution of data transfer operations. In the preferred embodiment, the tables include data control word (DCW) and instruction data control word (IDCW) tables. The IDCW table includes list pointer words (LPW's) which points to a DCW table. The DCW table stores a list of DCW's which are pointers to information areas in local memory. The LPW and DCW values are normally stored by the multiplexer module and used to produce memory commands for referencing backing store. The system sets predetermined bits in the LPW's and DCW's to predetermined states for those situations in which the information being read by the multiplexer module from backing store is to be stored in cache store.

By having the capability of altering the state of the predetermined bit within each memory command, the different command modules of the input/output system are able to have faster access to information without undue overwriting or destruction of information stored in the cache thereby enabling certain operations to be performed more expeditiously.

The novel features which are believed to be characteristic of the invention both as to its organization and method of operation, together with further objects and advantages will be better understood from the following description when considered in connection with the accompanying drawings. It is to be expressly understood, however, that each of the drawings is given for the purpose of illustration and description only and is not intended as a definition of the limits of the present invention.

BRIEF DESCRIPTION OF THE DRAWINGS

FIGS. 4a and 4b show in greater detail the multiplexer unit of FIG. 1.

FIG. 9 shows the format of a ZAC memory command in accordance with the present invention.

FIGS. 10a and 10b show the format of a list pointer word and data control word in accordance with the present invention.

DESCRIPTION OF THE PREFERRED EMBODIMENT

General Description

Figure 1:
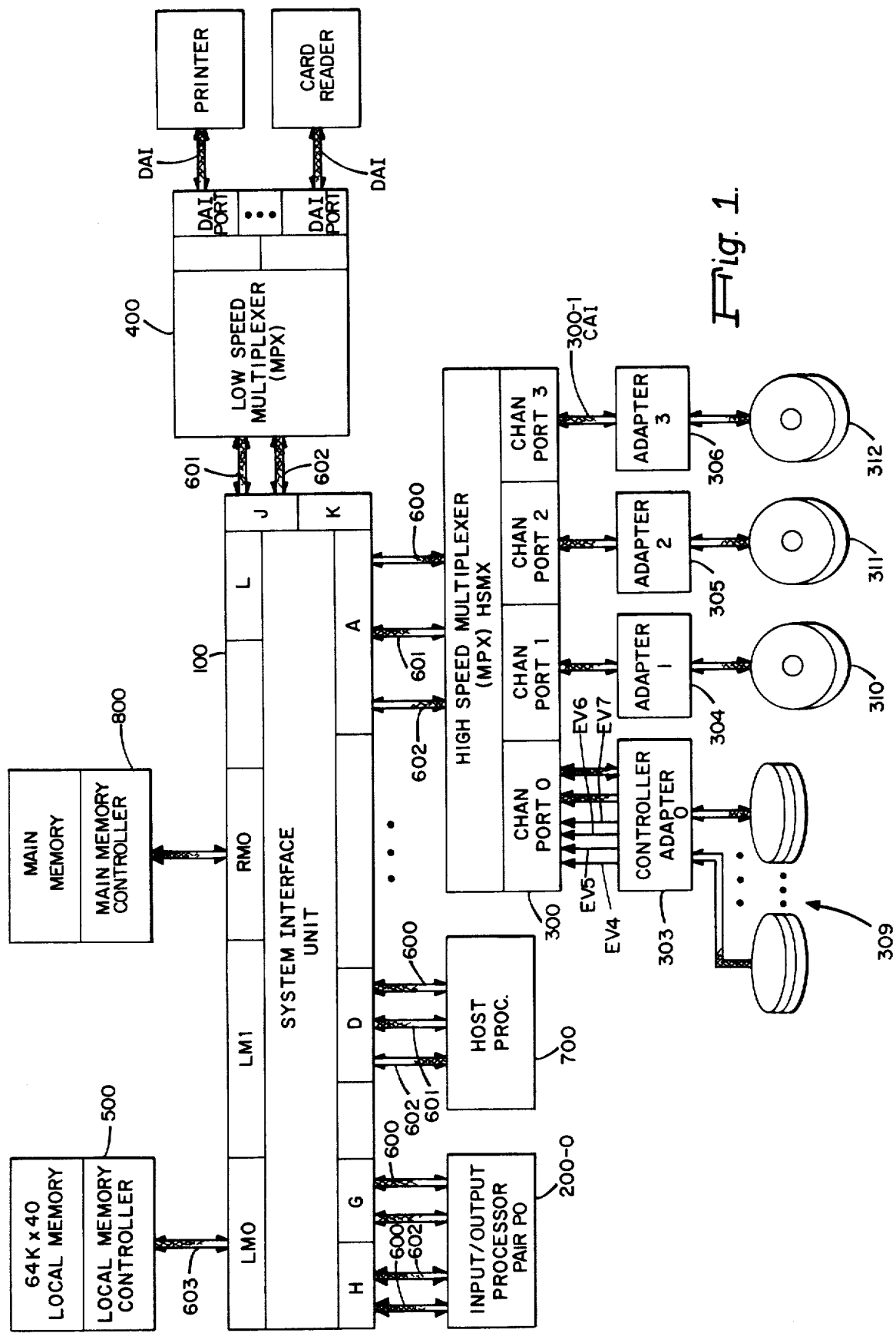
FIG. 1 illustrates in block diagram form an input/output system employing the principles of the present invention.

As seen from FIG. 1, the system which incorporates the principles of the present invention includes at least one input/output processor pair (PO) 200-0, a system interface unit (SIU) 100, a high speed multiplexer (HSMX) 300, a low speed multiplexer (LSMX) 400, a host processor 700 and a number of memory modules corresponding to a local memory module 500 and main memory module 800. Different ones of these modules connect to one of a number of ports of the system interface unit 100 through a plurality of lines of different ones of different types of interfaces 600 through 603. More specifically, the input/output processor 200, the host processor 700 and high speed multiplexer 300 connect to ports G, E and A respectively while the low speed multiplexer 400 and memory modules 500, 500a and 800 connect to ports J, LMO and RMO respectively.

The input/output system of FIG. 1 can be viewed as including a number of "active modules", "passive modules" and "memory modules". The IOP processor 200, host processor 700 and high speed multiplexer 300 serve as active modules in that each have the ability to issue commands. The active modules normally connect to ports A through H. A plurality of passive modules are connected to three ports J, K and L. These modules correspond to the low speed multiplexer 400 and the system interface unit 100 and are units capable of interpreting and executing commands applied to the lines of interface 601 as described herein. The last group of modules constitute local memory modules and remote memory modules such as those of the main system which are capable of executing two different types of commands applied to the lines of interface 603.

The input/output system of FIG. 1 normally functions as an input/output subsystem responsive to input/output instructions issued by host processor 700 which normally connects to port F via the interfaces 600 and 601 which correspond to a data interface and a programmable interface respectively described in greater detail herein. Ports F and E include interfaces for enabling connection of either multiplexer or processor modules of FIG. 1.

For the purpose of the present invention, processor 700 is conventional in design and may take the form of those units described in U.S. Pat. No. 3,413,613. In the preferred embodiment, the input/output processor 200 initiates and terminates channel programs required for the execution of input/output instructions, processes interrupt requests received from the system interface unit 100 and directly controls unit record peripheral devices coupled to low speed multiplexer 400. The processor 200 connects to port H via the data interface 600 and interrupt interface 602.

The low speed multiplexer 400 which for the purposes of the present invention can be considered conventional in design, provides for attachment of low speed peripheral devices via peripheral adapters, each of which couple to the lines of a device adapter interface (DAI). The interface and adapter may take the form of those units described in U.S. Pat. No. 3,742,457 which is assigned to the assignee of the present invention. The low speed devices include card readers, card punches and printers. As seen from FIG. 1, the multiplexer 400 connects to port J via the programmable interface 601.

The high speed multiplexer 300 directly controls transfers between the groups of disk devices and tape devices 309 through 312 which connect to different ones of the channel adapters 302 to 305. Each of the channel controller adapters 303 through 306 which can to a maximum of 16 devices, in turn connects to a different one of the ports or channels 0 through 3 via the interface lines of a channel adapter interface (CAI) 301-1. The high speed multiplexer 300 connects to port A corresponding to a data interface 600, a programmable interface 601 and an interrupt interface 602.

For purposes of the present invention, each of the 5 channel controller adapters 302 through 305 may be considered conventional in design and take the form of controller adapters described in the aforementioned U.S. Pat. No. 3,742,457.

As mentioned previously, each of the modules connect to different ports of the system interface unit 100. The unit 100 controls the connection of the different modules to each other via transfer paths enabling the transfer of data and control information between pairs of modules. For the purposes of the present invention, the system interface unit 100 can be viewed as a switching network enabling each of the "active" modules to transfer data to and from local memory module 500 when the requesting module has the highest priority and is granted the next available memory cycle. That is, as explained herein, the unit 100 includes priority logic circuits which determine the relative priority of requests from each of the active modules and grants the next available memory cycle to the highest priority request received.

Additionally, the unit 100 includes interrupt priority logic circuits which determine the relative priority of interrupt requests received from each of the modules and selects the highest priority request received and passes the request to processor 200 via a switching network as explained herein.

THE PORT INTERFACES

Before describing in greater detail different one of the modules of FIG. 1, each of the interfaces 600 through 603 referred to previously will now be described with reference to FIGS. 5a through 5d.

Figure 5A:
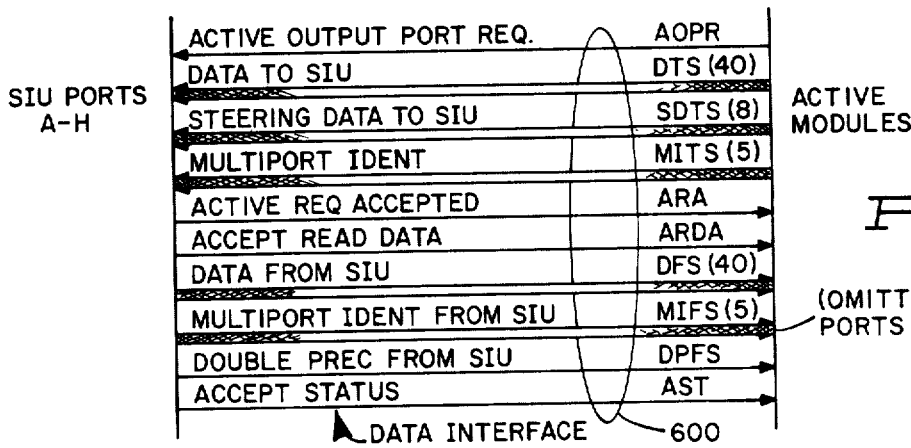
FIGS. 5a and 5d show the various interfaces of FIG. 1.

Referring first to FIG. 5a, it is seen that this figure discloses the lines which constitute the data interface which is one of the interfaces which provides for exchange of information between an active module and the system interface unit 100. Exchange is accomplished by controlling the logical states of various signal lines in accordance with pre-established rules implemented through a sequence of signals termed "a dialog".

As seen from FIG. 5a, the interface includes an active output port request line (AOPR), a plurality of data to SIU lines (DTS 00-DTS 35, P0-P3), a plurality of steering data to SIU lines (SDTS 0-6, P), a plurality of multiport identified to SIU lines (MITS 0-3, P), an active request accepted line (ARA), an accept read data line (ARDA), a plurality of data from SIU bus lines (DFS 00-35, P0-O3), a plurality of multiport identifier from SIU lines (MIFS 0-3, P), a double precision from SIU line (DPFS), and an accept status line (AST). The description of the interface lines are given in greater detail in the section to follow.

| DATA INTERFACE LINES | |
|---|---|
| Designation | Description |
| AOPR | The active output port request line is an unidirectinal line which extends from each of the active modules to the SIU 100. When set, this line signals the SIU that the module request a transfer path over which a command or data are to be transmitted. |
| DTS 00-35, P0-P3 | The data path lines are a four byte wide undirectional path (four 10 bit bytes) that extends between each of the active modules and the SIU and are used for transferring commands or data from each active module to the SIU 100. |
| SDTS 0-6, P | The steering data to SIU lines extend from each active module to the SIU 100. These lines are used to apply steering control information to the SIU 100 when the line AOPR is set. Steering control information consists of seven bits and a parity bit which are coded as follows.<br>(a) The state of bit 0 - The type of command applied to the DTS lines command (whether the comand is a programmable interface command or a memory command).<br>(b) Bits 1-4 are coded to indicate which one of the modules are to receive and interpret the command (commands are interpreted only by memory modules and programmable interface commands shall be interpreted by all modules except input/output processor 200).<br>(c) The state of bit 5 indicates whether one or two words of the command information is to be transferred between the requesting active module and the designated receiving module (one word specifies a single precision transfer and two words specifies a double precision transfer).<br>(d) The state of bit 6 indicates the direction of transfer between the requesting module and the designated receiver module.<br>(e) Bit P is a parity bit generated by the requesting active module which is checked by apparatus included within the SIU 100. |
| MITS 0-3, P | The four multiport identifier to SIU lines extend from active module to the SIU 100. These lines are coded to indicate which subchannel or port within an active module caused the setting of line AOPR. |
| ARA | The active request accepted line extends from the SIU 100 to each of the active modules. This line is set to indicate that the designated receiving module has accepted the active module's request which allows the module to remove the requested information from the data interface lines. |
| ARDA | The accept read data line extends from the SIU to each of the active modules. This line is set by the SIU 100 to indicate to the active module that it is to accept the previously requested data from a designated module. |
| DFS 00-35, P0-P3 | The eata from SIU lines are another set of data path lines which are a four byte wide unidirectional path (four 10 bit bytes) which extends from the SIU to each active module. These set of lines are used by the SIU 100 to convey read type data to a designated one of the active modules. |
| MIFS 0-3, P | The four multiport identifier lines plus odd parity line extend from the SIU 100 to each of the active modules. These lines are coded to indicate which port or subchannel on the active module is to accept the data of a previous read operation from the SIU 100. |
| DPFS | The double precision from SIU line extends from the SIU to each of the active modules. The state of this line indicates whether one or two words of read data are to be accepted by the active module to complete a transfer (read command). |
| AST | The accept status line extends from the SIU 100 to each active module. The state of this line which is mutually exclusive of line ARDA signals the active module that it should accept status information applied to the DFS lines. |

Figure 5B:
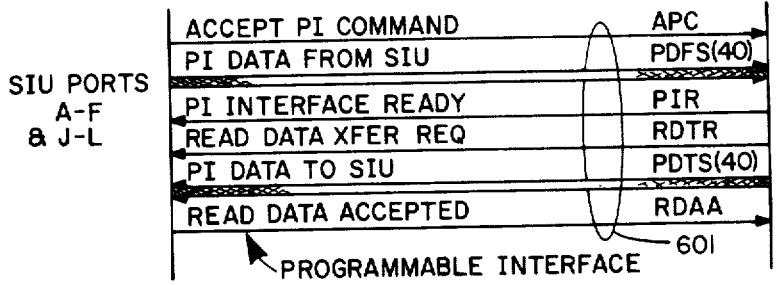

The lines of the programmable interface 601 shown in FIG. 5b provide for transfer of command information from an active module and a designated module. The transfer is accomplished by controlling the logic of states of the various signal lines in accordance with pre-established rules implemented through a sequence of signals termed "dialog". The programmable interface includes an accept programmable interface command line (APC), a plurality of programmable interface data from SIU lines (PDFS 00-36, P0-P3), a programmable interface ready line (PIR), a read data transfer request line (RDTR), a plurality of programmable interface data to SIU lines (PDTS 00-35, P0-P3) and a read data accepted line (RDAA). The description of the interface lines are given in greater detail herein.

| PROGRAMMABLE INTERFACE LINES | |
|---|---|
| Designation | Description |
| APC | The accept programmable interface command line extends from the SIU 100 to each receiving module. When set, this line signals the module that command information has been applied to the PDFS lines of the interface by the SIU and is to be accepted by the module. |
| PDFS 00-35, P0-P3 | The programmable interface data from SIU lines are a four byte wide unidirectional path (four 10 bit bytes) that extend from the SIU 100 to each module. These lines apply programmable interface information from the system interface unit to a designated receiving module. |
| PIR | The programmable interface ready line extends from each module to the SIU. When set, this line indicates that the module is ready to accept a command to be applied to line PDFS. |
| PDTS 00-35, P0-P3 | The programmable interface data to the SIU lines are a four byte wide unidirectional path (four 10 bit bytes) that extends from each module to the SIU 100. These lines are used to transfer programmable interface information to the SIU. |
| RDTR | The read data transfer request line extends from each module connected to the programmable interface to the SIU 100. When set, this line indicates that the previously requested read data is available for transfer to a module and has been applied to the lines PDTS by the module. |
| RDAA | The read data accepted line extends from the SIU 100 to each module. When set, the line indicates to the module that the data applied to the lines PDTS has been accepted and that the module may remove the information from these lines. |

Figure 5C:
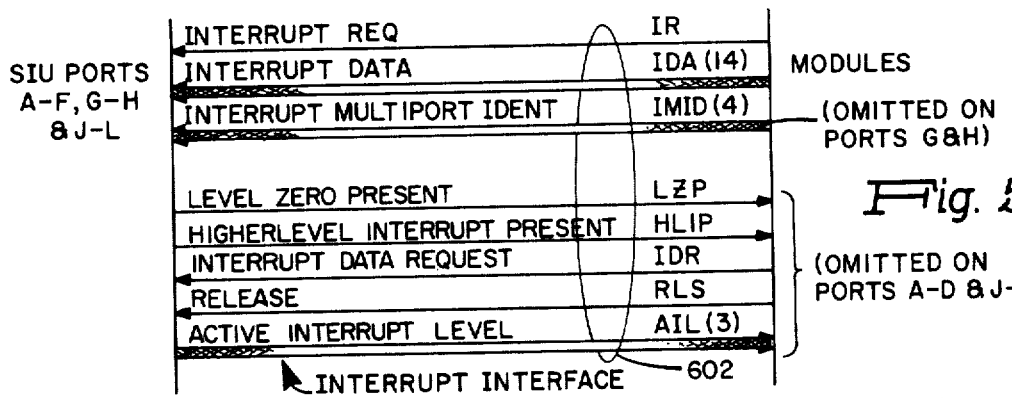

A further interface is the interrupt interface 602 of FIG. 5c which provides for interrupt processing by the input/output processor 200. That is, the interface enables the transfer of interrupt information by an active module to the SIU 100 as well as the transfer of interrupt information by the SIU 100 to the input/output processor 200 for processing. Similar to the other interfaces, the transfer of interrupt requests is accomplished by controlling the logical states of the various signal lines in accordance with pre-established rules implemented through a sequence of signals termed "dialog".

The interface includes an interrupt request line (IR), a plurality of interrupt data lines (IDA 00-11, P0-P1) and a plurality of interrupt multiport identifier lines (IMID 00-03) for modules connected to ports A through L. For modules connected to ports G and H, the interrupt interface further includes to a level zero present line (LZP), a higher level interrupt present line (HLIP), an interrupt data request line (IDR), a release line (RLS) and a plurality of active interrupt level lines (AIL0-2). As seen from FIG. 5c, the interrupt interface ports G and H do not include an interrupt multiport identifier line. The description of the interrupt interface lines are given in greater detail herein.

| INTERRUPT INTERFACE LINES | |
|---|---|
| Designation | Description |
| IR | The interrupt request line extends from each module to the SIU 100. When set, this line indicates to the SIU that it requires service. |
| IDA 0-3, P0, IDA 4-11, P1 | The interrupt data lines extend from an active module to the SIU 100. These lines are coded to contain control information reqired to be transferred to the input/output processor when an interrupt request has been accepted by the processor. These bits are coded as follows: (a) The state of bit 0 specifies to the SIU 100 which os the two processors (i.e. processor number) is to process the interrupt request. (b) Bits 1-3 are coded to indicate the priority or level number of the interrupt request to the SIU 100. (c) Bit P0 is a parity bit for bits 0-3. (d) Bits 4-8 are coded to provide a portion of an address required to be generated by the input/output processor 200 for referencing the correct procedure for processing the interrupt (i.e. an interrupt control block number ICBN). (e) Bit P1 is a parity bit for bits 4-11. |
| IMID 00-03 | The interrupt multiport identifier lines extend from each active module to the SIU 100. These lines are coded to identify which specific subchannel of the active module has requested interrupt service. |
| LZP | The level zero present line extends from the SIU 100 to the input/output processor 200. When set, this line indicates that there is a highest priority (level 0 interrupt) request being directed to the processor 200 by the SIU 100. |
| HLIP | The higher level interrupt present line extends from the SIU to the input/output processor. When set, this line indicates that there is an interrupt request having a higher level or priority than the procedure or process being executed by the processor 200. |
| IDR | The interrupt data request line extends from the input/output processor 200 to the SIU 100. When set, this line indicates that interrupt data is to be sent to the processor on lines DFS by the SIU 100. |
| RLS | The release line extends from the input/output processor 200 to the SIU 100. This line when set indicates that the processor 200 has completed execution of the current procedure. |
| AIL 0-2 | The active interrupt level lines extend from the SIU to the input/output processor 200. These lines are coded to designate the interrupt level number of the procedure being executed by the processor 200. |

Figure 5D:
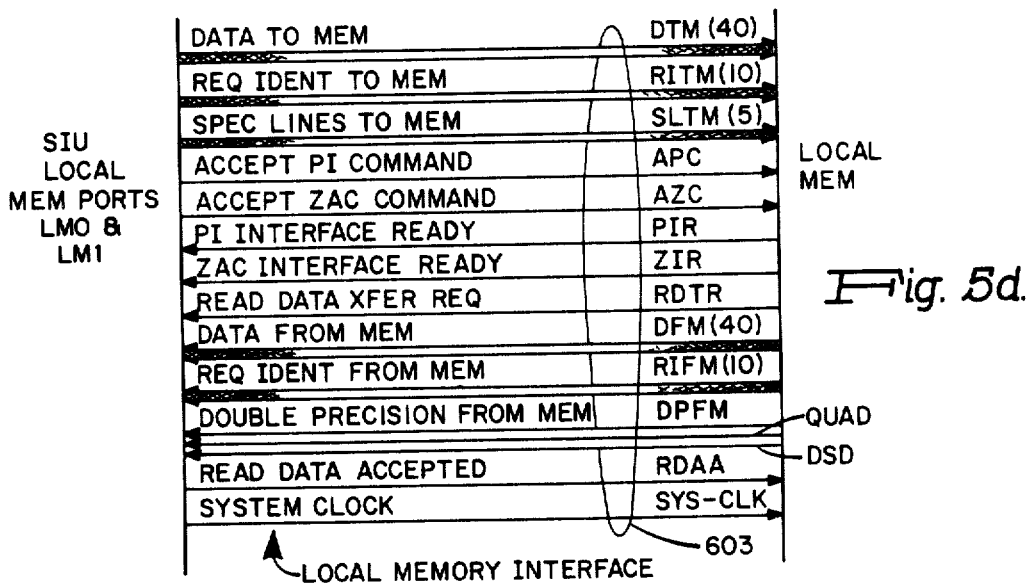

A last set of interface lines utilized by certain ones of the modules of FIG. 1 corresponds to the local memory interface lines of FIG. 5d. The local memory interface 603 provides for exchanging information between local memory 500 and the modules of the system. The exchange is accomplished by controlling logical states of the various signal interface lines in accordance with pre-established rules implemented through a sequence of signals termed "a dialog". The local memory interface includes a plurality of data to memory lines (DTM 00-35, P0-P3), a plurality of request identifier to memory lines (RITM 0-7, P0-P1), a plurality of specification lines to memory lines (SLTM 0-3, P), an accept PI command line (APC), an accept ZAC command line (AZC), a PI interface ready line (PIR), a ZAC interface ready line (ZIR), a read data transfer request line (RDTR), a plurality of data from memory lines (DFM 00-35, P0-P3, a plurality of request identifier from memory lines (RIFM 0-7, P0-P1), a double precision from memory line (DPFM), a QUAD line, a read data accepted line (RDAA) and a system clock line (SYS-CLK).

Memory and programmable interface commands are transferred out of the same physical data lines of the interface. The interface does not include a set of lines for processing interrupt requests and therefore the modules connected to the local memory by the SIU 100 cannot directly cause a memory interrupt. The description of the local memory interface lines are given in greater detail herein.

| LOCAL MEMORY INTERFACE LINES | |
|---|---|
| Designation | Description |
| DTM 00-35, P0-P3 | The data path lines constitute a four byte wide unidirectional path (36 information lines and four odd parity lines) that extends from the SIU 100 to the local memory 500. These lines are used to transfer memory or programmable interface commands to the local memory 500. |
| RITM 0-3, P0 RITM4-7, P1 | The requestor identifier to memory lines constitute two groups of four lines which extend from the SIU 100 to the local memory 500. These lines are coded to convey information to the local memory identifying the module which initiated the command and are used to return the data requested to the proper module. |
| SLTM 0-3, P | The specification lines to memory extend from the SIU 100 to the local memory 500 and include two port number selection lines, a read/write to memory line, a double precision to memory line and a parity line. The information signals applied to these lines are coded as follows (a) Bits 0-1 are port number selection bits coded to specify which port or subchannel within the attached module is to receive or interpret the memory command sent to the module. (b) Bit 2 is a read/write to memory bit which is included in the steering control information received from the active module which is forwarded by the SIU to the local memory 500 when a new command is sent to the memory by the SIU 100. The state of this bit indicates the direction of data transfer. (c) Bit 3 is a double precision to memory bit coded to specify the amount of data to be transferred. It is also included in the steering control information provided by the active module which is forwarded to the local memory module 500 by the SIU 100 when a new command is sent to the memory module. |
| AZC | The accept ZAC command line extends from the SIU 100 to the local memory module 500. When set, this line signals the local memory module 500 to accept the ZAC command and control information applied to the other lines by the SIU 100. The setting of this interface line is mutually exclusive with the accept PI command interface line. |
| APC | The accept programmable interface command line, as described in connection with the programmable interface, extends from the SIU 100 to the local memory module 500. When set, this line indicates that the command information applied to the lines DTM is to be accepted by the local memory module 500. |
| PIR/ZIR | The programmable interface ready line/ZAC interface ready line extends from the local memory module 500 to the SIU 100. When set, each line signals the SIU 100 that the local memory module 500 is capable of accepting a programmable interface (PI)/memory (ZAC) command. |
| RDTR | The read data transfer request line extends from the local memory module 500 to the SIU 100. This line when set indicates that the read type data previously requested by a ZAC or PI command is available along with the necessary control information to be sent to the module requesting the data. |
| DFM 00-35, P0-P3 | The data from memory lines are a four byte wide unidirectional bus which extends from the local memory module 500 to the SIU 100. These lines are used to return read requested type data to an actve module via the SIU 100. |
| RIFM 0-3, P0, RIFM 4-7, P1 | The two groups of requestor identifier from memory lines extend from the local memory module 500 to the SIU 100. These lines are coded for directing the read data back from module 500 back to the requesting module. |
| DPFM and | The double precision from memory line and |

| -continued | |
|---|---|
| LOCAL MEMORY INTERFACE LINES | |
| Designation | Description |
| QUAD | QUAD line extend from the local memory module 500 to the SIU 100. These lines are coded to indicate the number of words to be transferred via the SIU 100 to the requesting module during read data transfer request time interval. These lines are coded as follows<br>QUAD DPFM<br>0 0 one word single precision<br>0 1 two words, double precision<br>1 X (don't care) four words |
| DSD | The read data/status identifier line extends from the local memory module 500 to the SIU. The state of this line signals the SIU 100 whether the informatin applied to the lines DFM is read data or status information when line RDTR is set. When set, the line indicates status information of one or two words (QUAD = 0) is being transferred. When set to a binary ZERO, the line signals that up to four words of data are being transferred, the number being specified by the coding of lines QUAD and DPFM. |
| RDAA | The read data accepted line as mentioned in connection with the programmable terminal extends from the SIU 100 to the local memory module. When set, this line signals the memory module that the data applied on the interface lines by the local memory module has been accepted and that the local memory module may remove data from these lines. |
| SYS-CLK | The system clock line is a line which extends from the SIU 100 to each module of the system. This line is connected to a clock source included within the input/output processor 200 to synchronize the operations of each memory module from a common system clock source. |

While FIGS. 5a through 5d show the lines which connect the different modules of the system of FIG. 1 to the SIU 100, it will be appreciated that other lines are also included for signaling other conditions as for example error conditions and operational conditions. Having described the different types of interfaces utilized by the modules of FIG. 1, each of the modules pertinent to the understanding of the present invention will now be described in greater detail.

Detailed Description of Input/Output Processor Pair 200-0

Figure 2:
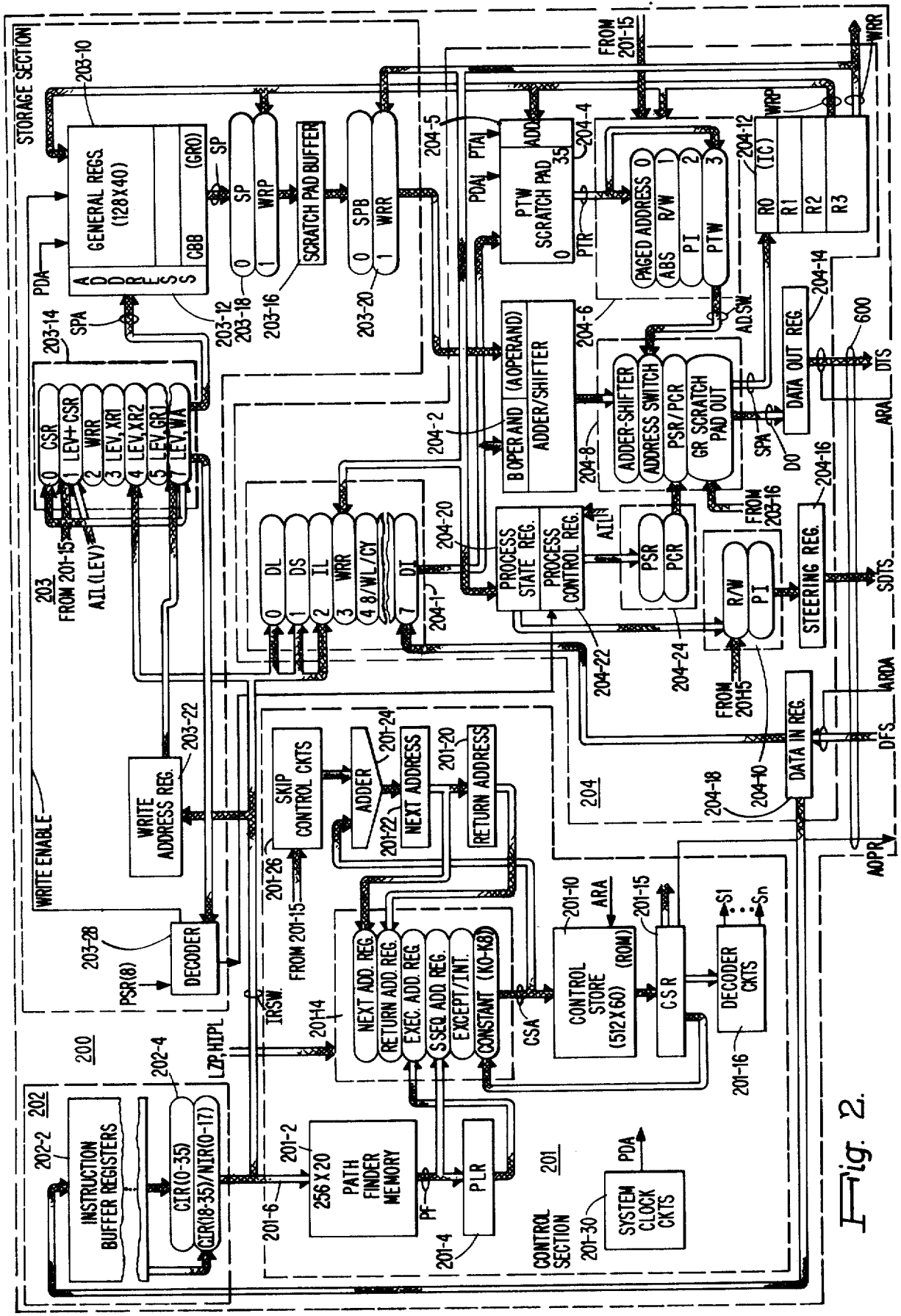
FIG. 2 shows in greater detail the input/output processing unit of FIG. 1.

Referring to FIG. 2, it is seen that each processor 200 of pair P0 comprises a microprogrammed control section 201 operative to generate control signals in response to microinstructions stored in a control store 201-10 for executing instructions, an instruction buffer section 202 for storing instructions fetched from the local memory module 500, a storage section 203 and a processing section 204 for performing arithmetic and logic operations under the control of microprograms stored in control store 201-10. The processor pair arrangement ensures system reliability and is discussed in detail in the first referenced application.

Control Store Section 201

Considering each section in greater detail, the control store 201-10 is constructed of fixed sections which use for example a read only (ROM). The store 201-10 is addressable via signals from any one of the eight address sources applied to a selector switch 201-14. The contents of the addressed locations are read out into an output register 201-15 and decoded by decoder circuits included within a block 201-16.

Additionally, as shown, signals from one of the fields of the microinstruction contents of register 201-15 are applied as an input to the switch 201-14 for selecting which one of the eight input sources is to apply an address to control store 201-10. The microinstructions read out to register 201-15 include address constants for branching the control store 201-10 to appropriate microprogram routines.

As seen from FIG. 2, the eight control store address sources include: interrupt/exception signals derived from signals applied by the system interface unit 100 and circuits included within processor 200; a next address register position which receives next address information stored in a register 201-22 via an adder circuit 201-24; a return address register position which receives the return address contents of a return register 201-20; an exception address register position which receives an address from a pathfinder memory 201-2 via memory output register 201-4 a sequence address register position which also receives an address from register 201-4; and a constant position which receives a constant value from the output register 201-15.

The appropriate next address is generated by adder circuit 201-24 which receives as one operand input, address signals from one of the sources selected by switch 201-14 and as other operand input, signals from skip control circuits of a block 201-26. The skip control circuits are conditioned by constant signals stored in control store register 201-15 which in turn provide an appropriate value as one of the operand inputs to the adder 201-24. The resultant address generated by adder circuit 201-24 represents the sum of the addresses applied by switch 201-14 and constant signals provided by skip control circuits of block 201-26. Briefly, the different positions of switch 201-14 are selected in response to microinstructions read from control store 201-10 to provide appropriate addresses for microprograms stored in control store 201-10 required for the execution of an operation specified by the op code of a program instruction. The instruction op code is applied to the pathfinder memory 201-2 via path 201-6 as shown. The return address register position of switch 201-14 is selected during program sequencing as a consequence of a branch operation while the constant register position is selected to provide for a branch to a predetermined location in the control store 201-10 defined by the constant field of the microinstruction stored in register 201-15.

Interrupts are processed at the completion of execution of a program instruction. It is seen in FIG. 2 that a higher level interrupt present (HLIP) and level zero interrupt (LZP) lines apply signals to switch 201-14. The signal applied to the HLIP line is "ANDed" with interrupt inhibit signals from a process control register 204-22 and the result is ORed with the signal applied to the LZP line. When the higher level interrupt present signal is not inhibited or there is a signal applied to the LZP line, signals from circuits, not shown connected to switch 201-14 select the exception/interrupt position. The signal lines indicative of the presence of an interrupt (LZP and HIPL) cause the selection of an interrupt sequence of microinstructions to be referenced in lieu of referencing the microinstruction sequence for executing the next program instruction.

Signal lines indicative of "exceptions" are applied to control circuits, not shown, associated with switch 201-14 and cause the selection of the exception/interrupt position. This provides an address for referencing an exception sequence of microinstructions. Depending upon the type of execution, the exception may be processed immediately because continuing program instruction execution must be prevented or it is not possible (e.g. faults, illegal instructions). The exception is processed upon the completion of execution of the program instruction where the condition does not require immediate attention (e.g. time out, overflow, etc.). As explained herein, the occurrence of exceptions cause the exception/interrupt position of 201-14 to be selected and the setting of an appropriate bit position in process control register 204-22.

Timing signals, designated as PDA in FIG. 1, required for establishing appropriate memory cycles of operation for control section 201 as well as timing signals for operating other sections of processor 200 and the other modules of the system of FIG. 1 are provided by clock circuits included within a block 201-30. For the purpose of the present invention, the clock circuits as well as the other circuits of FIG. 2 can be considered conventional in design and can for example take the form of circuits disclosed in the publication titled "The Integrated Circuits Catalog for Design Engineers" by Texas Instruments Inc., printed 1972. More specifically, the clock circuits can comprise a crystal controlled oscillator and counter circuits while the switch 201-14 can comprise a plurality of data selector/multiplexer circuits.

From the above, it is seen that as in most microprogrammed control machines, the control store 201-10 provides the necessary control for each processor cycle of operation. That is, each microinstruction word read out from control store 201-10 during a cycle of operation is divided into a number of separate control fields which provide the necessary input signals to the various selector switches of FIG. 2 for addressing of the different scratch pad memories and selection of operands, signals for specifying various test conditions for branching, signals for controlling the operation of an adder/shifter unit of section 204 and signals for providing control information necessary for generating commands. For more detailed information regarding the operation of control section 201, reference may be made to the copending application titled "Pathfinder Control Memory" invented by G. Wesley Patterson et al which is assigned to the assignee of the present invention. Reference may also be made to other ones of the documents referenced in the introductory portion of the specification.

Instruction Buffer Section 202

This section includes a plurality of registers 202-2 for storing up to four words of instructions fetched from local memory module 500 and applied via a data in register 204-18. The group of registers 202-2 are connected to a two position instruction register switch 202-4 which is arranged to provide two outputs, a current instruction read output (CIR) and a next instruction read output (NIR). The selection of instruction words on a half or full word basis is made in accordance with the states of bit positions of the current instruction counter (IC) normally stored in a first of the working registers of block 204-12. For the purpose of the present invention, the arrangement can be considered conventional in design.

Storage Section 203

As seen from FIG. 2, this section comprises a scratch pad memory containing eight sets or groups of registers associated with eight different processes each assigned a different one of eight priority levels. The highest priority level is level 0 and the lowest priority level is level 7. Each group or level includes 16 registers used as described herein.

The scratch pad memory 203-10 is addressed via an eight position data selector switch 203-14 which selectively applies a seven bit address from any one of eight sources to address inputs 203-12. The three most significant bit positions of address inputs 203-12 select one of the eight sets of registers (i.e. the level) while the remaining four bits select one of the sixteen registers. Signals applied to the active interrupt level (AIL) lines by the SIU 100 provide the three most significant bits to the scratch pad address inputs 203-12. The remaining signals are provided by control store register 201-15 or fields from the instruction applied via the IRSW.

The write address register 203-22 is loaded via switch 202-4 to store signals corresponding to either bits 9-12 or bits 14-17 of the current program instruction as designated by one of the fields of the microinstruction contained in register 201-15. Accordingly, the write address register address storage for loading or returning a result to one of the general registers of scratch pad memory 203-10. The write operation occurs upon the generation of a write clock signal which occurs either in response to switching to a binary ONE a clocked write flip-flop not shown, or in response to a field of a microinstruction loaded into register 201-15. When generated by the write flip-flop, the write clock signal occurs when the write flip-flop is reset to a binary ZERO upon the occurrence of a next PDA clock pulse. This allows a write operation relating to a program instruction to occur during the start of processing the next instruction.

It will be noted that the contents of the write address register 203-22 are applied to a decoder network 203-28 via selector switch 203-14 which is operative to generate a signal on an output line each time register 203-22 stores an address of 0, 1 or 15. This signal inhibits the generation of a write clock pulse by gating circuits, not shown, when write flip-flops is in a binary ONE state. Additionally, the decoder network 203-28 receives a mode signal from the process state register 204-20. The state of the signal which indicates whether the processor 200 is in a master or slave mode of operation is "ANDED" with the output signal and is used to generate an exception signal on another output line which is applied as an input to process control register 204-22 and to one causes selection of the exception-interrupt position of switch 201-14. As explained herein, this prevents alteration of the contents of the process state register location (GR0) of scratch pad memory 203-10.

The contents of an addressed register location are read out into a scratch buffer register 203-16 via a first two position data selector switch 203-18. The contents of the buffer register 203-16 are then selectively applied to processing section 204 via a further two position data selector switch 203-20. The different positions of each of the data selector switches 203-14, 203-18, and 203-20 are selectable by different fields contained in the microinstructions read out into register 201-15. The scratch pad memory 203-10 receives data signals applied from one of a pair of output buses selectively connected to any one of four working registers of block 204-12.

Each set of 16 registers includes a process state register (PSR) location (general register 0) for storing information essential to controlling the current process. The first eight bit positions of the register stores steering information coded to identify the interrupting module. The next position is a privilege bit position coded to identify the mode of operation (i.e. master or slave). The register also includes an external register bit position coded to indicate whether the register contents can be altered, an address mode bit position, two condition code bit positions, a carry bit position and 22 bit positions for storing a count which is periodically decremented while the associated process is active (i.e. serves as a "process timer"). Because of the frequency of access to the contents of the process state register required for modification or reference, signals representative of the contents of this register are stored in one of the registers of the processing section 204 (i.e. register 204-20). Thus, the general register storage location for storing the contents of the process state register serves to store the current value of the process state register of section 204 upon the occurrence of an interrupt.

Each group of registers further includes an instruction counter (general register 1) for storing the address of the current instruction of the process associated therewith. Additionally, each group of registers include a page table base register (general register 15), and a number of general registers (general registers 2-14) for providing temporary storage for operands and address information. The scratch pad memory 203-10 also includes a control block base (CBB) register location which stores an absolute address pointing to the base of an exception control block and interrupt control block tables stored in local memory module 500. The first register GR0 of the highest priority set of registers (level 0) which is never altered, stores the control block base information. The interrupt control block (ICB) tables include 256 groups of storage locations which store information for processing the type of interrupt. The exception control block (ECB) tables include 16 groups of storage locations which store information for processing the type of exception.

Exceptions are processor detected conditions which cause the processor 200 to enter automatically one of the 16 exception processing routines. The exception conditions are identified by a four bit exception number which corresponds to bits 10-13 of the program instruction when the processor enters master mode. In all other instances, the exception number is ZERO. The exception number (ECB#) is used to identify one of the four word exception control blocks (ECB) which points to an exception processing routine. The byte address of an ECB equals the control block base (CBB) − 16 (ECB # + 1). Each ECB includes values for loading the PSR, IC and PTBR registers in addition to a saving area pointer which serves as a stack area for storing information pertinent to the current process before the processor 200 enters the exception routine.

The address of an interrupt control block (ICB) equals the control block base (CBB) + 16(ICB#). The ICB# is obtained from the interrupt word as explained herein. Similarly, the ICB is a four word block and it contains values for the PSR, IC, GR14 and PTBR registers.

Processing Section 204

This section performs all of the arithmetic and logic operations required to process program instructions.

The section 204 includes an adder/shifter unit 204-1 capable of performing arithmetic, shift and logic operations upon a pair of 36 bit operands. The results produced by either an adder portion or shifter portion of unit 204-1 are selected in response to microinstructions and thereafter selectively transferred via a four position data selector switch 204-8 on a pair of output lines to any one of the working registers of block 204-12 and to a data output register 204-14. The data output register 204-14 connects to the lines of the processor data interface 600.

For the purposes of the present invention, the adder/shifter unit 204-1 can be considered conventional in design. Also, the unit 204-1 may include either circuits such as those disclosed in U.S. Pat. No. 3,811,039 to John P. Stafford or circuits disclosed in other documents referenced in the introductory portion of the present specification.

The block 204-12 includes four working registers R0 through R3 which provide temporary storage for the instruction counter and for addresses during instruction execution. The registers can be loaded from any one of the sources connected to switch 204-8 (i.e. adder/shifter 204-1, address switch 204-6, PSR/PCR switch 204-24 and scratch pad buffer input switch 203-18). The register to be loaded and the write signal required for loading the register is established by fields included within the micro-instruction read out to register 201-15.

As seen from FIG. 2, the registers are connected to a pair of output buses WRP and WRR. The WRP bus connects to address inputs 204-5, to switch 203-18 and to scratch pad memory 203-10. The WRR bus connects to A operand switch 203-20, to B operand switch 204-1, to register 204-20 and to register 204-22. The registers selected for connection to the WRR and WRP buses are designated by a pair of fields included within the microinstruction read out to register 201-15.

As seen from FIG. 2, the processing section 204 includes process state register 204-20 and a process control register 204-22. The process state register 204-20 as mentioned is loaded from scratch pad memory 203-10 via output bus WRR. The process control register 204-22 is a 36 bit register common to all eight interrupt levels.

The bit positions of the process control register 204-22 contain the following information. Bit positions 0–8 designate different types of non master mode exceptions which include the following.

| PCR BIT POSITION | EXCEPTION TYPE |
| --- | --- |
| 0 | Operation not complete; no response from SIU 100 on lines ARA or ARDA. |
| 1 | Page address bounds fault (key check). |
| 2 | Page access fault |
| 3 | Page not resident in memory |
| 4 | Illegal operation |
| 5 | Process timer run out |
| 6 | Overflow |
| 7 | Lockup fault |
| 8 | Address misalignment |

The term "fault" does not necessarily mean the occurrence of a hardward failure but includes error conditions, etc.

Bit positions 9–15 identify the location of parity errors and bit positions 23–26 identify the processor number and level received from the PNID and AIL lines. Bit position 27 is an interrupt inhibit bit position while bit positions 28–35 store interrupt request bits which when set to a binary ONE indicate an interrupt at a level corresponding to the bit position (e.g. bit 28 = level 0). The bit positions 27–35 are loadable by program instruction from the bank of registers of block 204-12 via output bus WRR. The contents of each of the registers 204-20 and 204-22 are selectively applied as an input to another one of the positions of the four position data selector switch 204-8 via a two position data selector switch 204-24. The register 204-20 also connects to the PI positions of a two position steering selector switch 204-10 and a four position address selector switch 204-6.

The steering switch 204-10 provides steering information to the SIU 100 which is used to transfer the command to the correct module. One of the fields contained in the microinstructions read out to register 201-15 selects the appropriate position for either a memory command or PI command. The steering information for a memory command is generated from fields included within the microinstruction and with paged address information from scratch pad memory 204-4 of absolute address information from bus WRP.

For a R/W command, the steering information is generated as follows: bit 0 is a binary ZERO for a R/W command; bit 1 defines local/remote memory and corresponds to PTW bit 0 (paged) or WRP bit 0 (absolute). Bits 2–4 correspond to PTW bits 1–3 (paged) or WRP bits 1–3 (absolute). Bits 5–6 correspond to bits of one of the fields of the microinstruction which are coded to designate whether it is a single or double word transfer and whether it is read or write cycle of operation. Upon the start of a memory cycle or initiation of a command, the signals from the steering switch 204-10 are loaded into a steering register 204-16 which applies the signals to the appropriate lines of the data interface 600 of processor 200. As explained herein, the command including additional steering information is provided by position 2 of address switch 204-6 in the case of a PI command.

As also seen from FIG. 2, processing section 204 includes a scratch pad memory 204-4 addressable via address inputs 204-5 which receives address signals from one of the registers connected to the WRP bus. The scratch pad memory 204-4 provides page table address storage for each of the eight interrupt levels used in generating absolute addresses for addressing local memory module 500. When addressed, the contents of the storage location of scratch pad memory 204-4 are read out to two of the four positions of the address switch 204-6. These two positions are used for page referencing of local memory module 500. Since the paging operations of scratch pad memory 204-4 are not particularly pertinent to the present invention, no detailed discussion is included herein.

The other two positions of the address selector switch 204-6 are used to provide the memory or PI command. More specifically, position 1 of address switch 204-6 when selected by an address control field of a microinstruction word stored in register 201-15 generates the R/W memory command information which includes bits 0–8 in accordace with predetermined fields of the microinstruction word and bits 9–35 coded to correspond to either paged address information from memory 204-4 or absolute address bits applied to output but WRP by the working registers of block 204-12. When the PI position of switch 204-6 is selected, the switch generates a programmable interface command word wherein bit 0 is a binary ZERO, bit 1 is supplied by a field of the microinstruction word stored in register 201-15, bit 2 is supplied by bit 9 of PSR register 204-20 and defines whether the current process can alter certain external registers, bits 5-8 are equal to bits 4-7 of register 204-20 and define the port or subchannel within the module, bit 3 is coded to specify the processor pair number supplied by the SIU 100, bit 4 is a ZERO and bits 9-35 equal bits 9-35 of bus WRP which correspond to the absolute address of the PI command.

DETAILED DESCRIPTION OF LOCAL MEMORY MODULE 500

Figure 6:
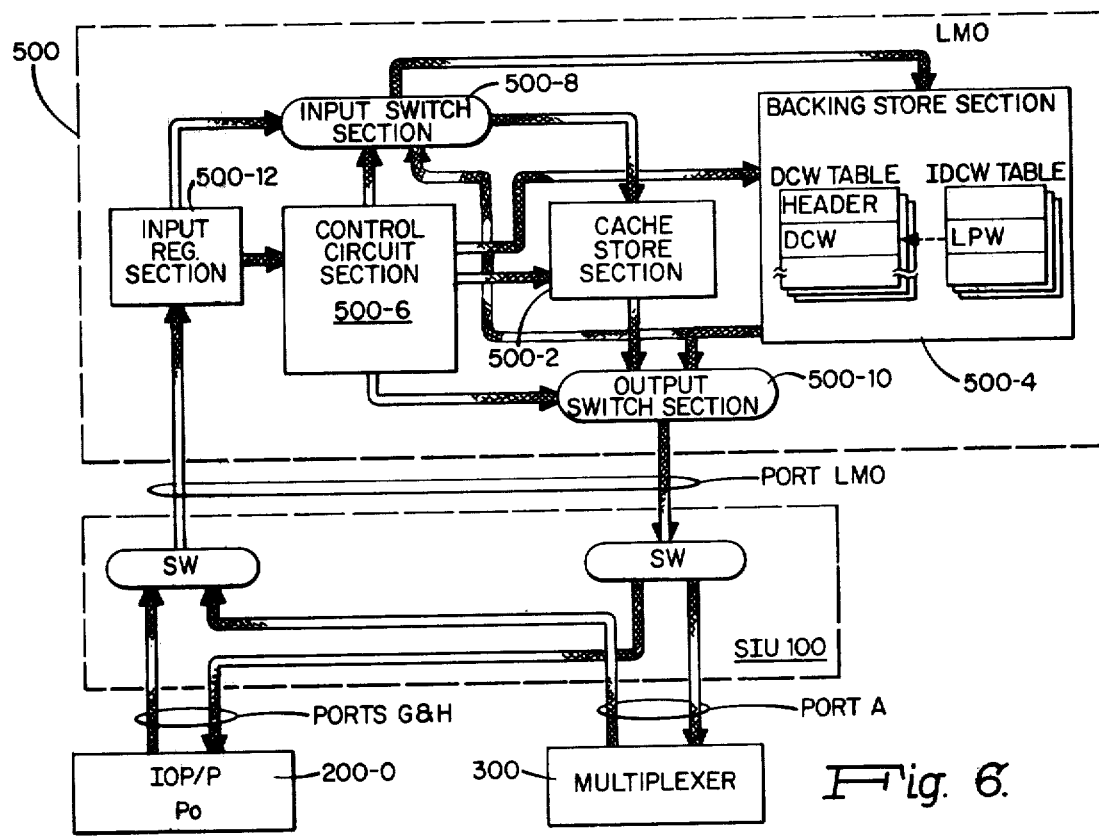
FIG. 6 shows in block diagram form the local memory module of FIG. 1.

FIG. 6 illustrates the major blocks which comprise the system of the present invention and a preferred embodiment of local memory module 500 in accordance with the teachings of the present invention. Referring to the figure, it is seen that module 500 includes a cache store section 500-2, a backing store section 500-4, an input register section 500-12, a control circuit section 500-6, an input switch section 500-8 and an output switch section 500-10 arranged as shown. The output switch section 500-10 and input register section 500-12 transfer and receive data and control information to and from either the processor pair PO or multiplexer module 300 via SIU 100 switches as explained herein.

Figure 7:
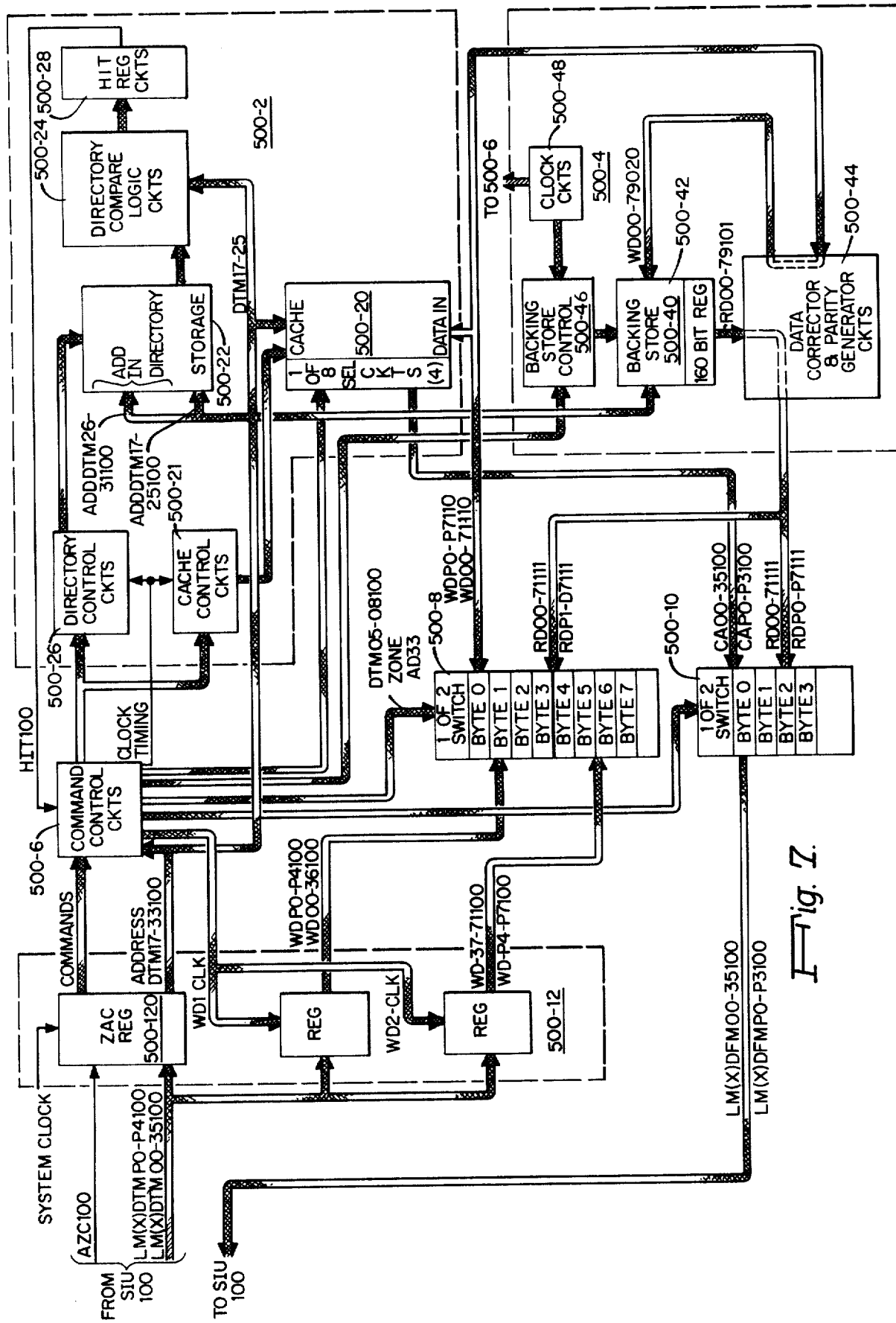
FIG. 7 shows in greater detail the local memory module of FIG. 6.

The cache store section 500-2 shown in greater detail in FIG. 7 includes a cache 500-20 with associated control circuits 500-21, a directory storage unit 500-22 with associated comparison circuits 500-24, hit logic circuits 500-28 and control circuits 500-26 arranged as shown. The cache store is organized into four levels or sections each of which are constructed from a plurality of bipolar circuit chips, conventional in design. Each level is divided into eight byte sections with each byte section including five bipolar circuit chips. The circuit chips each contains 128 addressable two bit wide storage locations with the total number of chips providing a capacity of 64 block address locations or 256 address locations wherein each block is defined as 4, 40 bit words, each word having four bytes (byte = 9 data bits + 1 parity bit).

The directory storage unit 500-22 stores the addresses of each cache block and is similarly organized into four levels. The unit 500-22 includes a round robin counter arrangement (not shown) for establishing which level of cache is to be written during a next cycle of operation. The different levels of cache define a column of 80 bits and cache block includes two such columns. The directory storage unit 500-22 is thus divided into a number of columns corresponding to the number of blocks in the cache. For the purpose of the present invention, the organization can be considered conventional in design and may be likened to the arrangement disclosed in U.S. Pat. No. 3,845,474 invented by Ronald E. Lange, et al. During a cache cycle of operation, four bytes are read out to the output multiplexer switch 500-10 via a number of one of eight selector circuits.

The directory storage unit 500-22 applies address signals to the comparison circuits of block 500-24. These circuits, conventional in design, operate to detect whether the information being requested resides in cache at any one of the four levels (i.e., presence of a hit). The compare circuits 500-24 apply the results of the comparison to the hit circuits of block 500-28. The hit circuits 500-28 in turn store the hit indications which are applied as inputs to the control logic circuits of block 500-6. The backing store section 500-4 includes a backing store 500-40, timing circuits 500-48, a 160 bit output register 500-42, data correction and parity generator circuits 500-44 and a number of control circuits of block 500-46 arranged as shown in FIG. 7. The circuits 500-48 include counter and delay line circuits. Conventional in design, which provide timing and control signals for synchronizing the overall operation of the memory module 500-2.

The backing store 500-40 is constructed from 4K MOS memory chips, conventional in design and has a capacity of 128K of memory words, each word having 40 bits (32K blocks). The data correction and parity generation circuits operate to detect and correct errors in the words being read from and being written into backing store 500-40. For the purpose of the present invention, these circuits may be considered conventional in design.

As seen from FIG. 7, the input register section includes a zone, address and command (ZAC) register 500-120, a first word buffer register 500-122 and second word buffer register 500-123 connected as shown. The ZAC register 500-120 stores the ZAC command word which has the format shown in FIG. 9. The input buffer registers 500-122 and 500-123 are connected to receive the data word or words of a ZAC command applied to the DTM lines of interface 603 by a requester module. The contents of registers 500-122 and 500-123 are applied to different byte positions of the one of two multiplexer switch 500-8. The switch 500-8 also receives the data read from backing store to be written into cache 500-20.

The command contents of the ZAC register 500-120 are applied to decoder gating circuits included in block 500-6 while the address signals are distributed to the circuits of block 500-6, directory storage unit 500-22, cache 500-20 and backing store 500-40 for the addressing thereof.

The circuits of block 500-6 generate the various control and timing signals for conditioning different portions of the local memory module for carrying out the operation specified by the command stored in ZAC register 500-120. This includes distributing control signals to input multiplexer switch 500-8 and to output multiplexer switch 500-10 for selecting the group of data signals to be written into backing store 500-40 and to be read from backing store 500-40 and cache 500-20 respectively. For the purpose of the present invention, the multiplexer or data selector circuits and registers in addition to the circuits of FIG. 8 to be discussed herein can be considered conventional in design and may take the form of circuits disclosed in the aforementioned Texas Instruments text.

Figure 8:
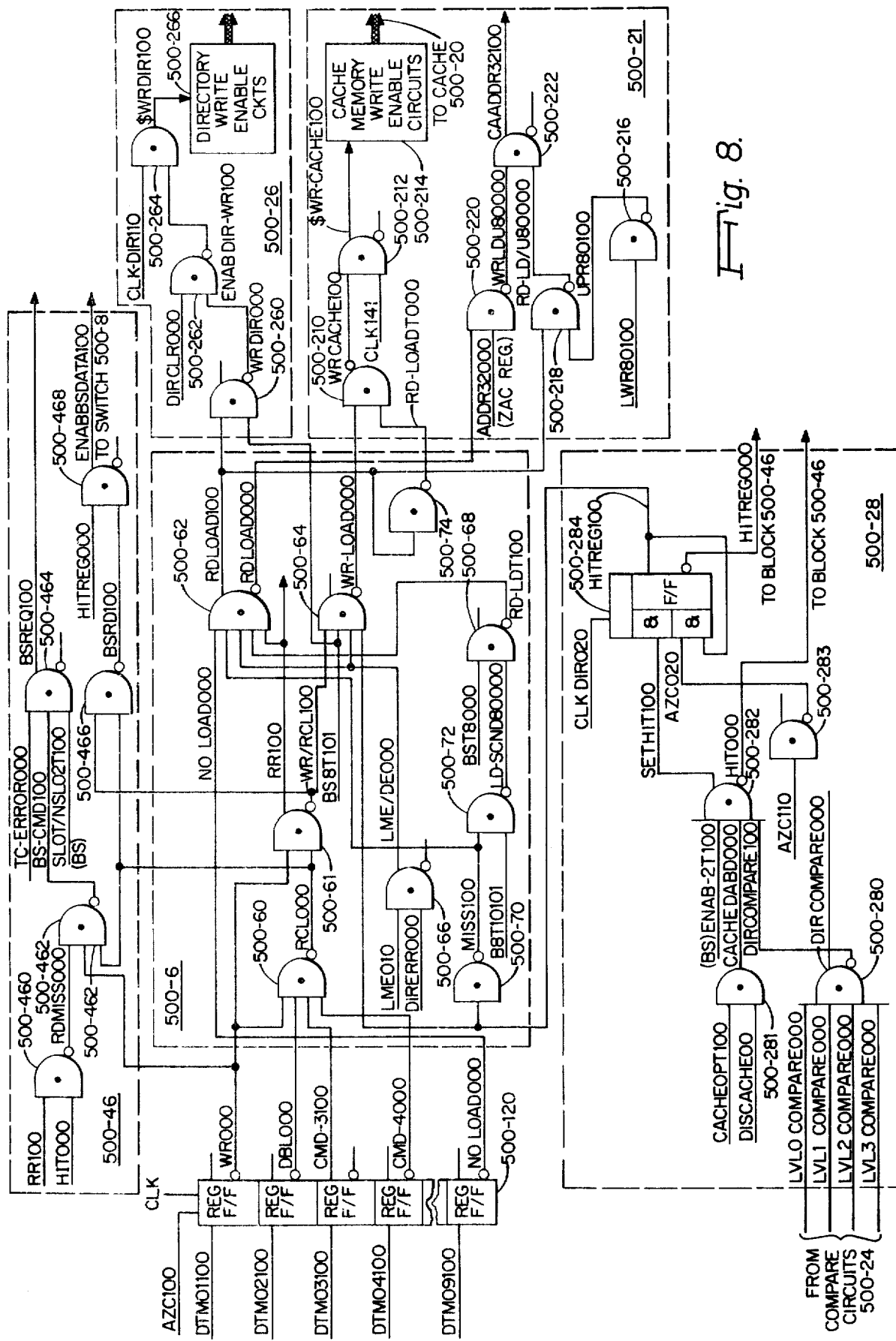
FIG. 8 shows in greater detail certain portions of FIG. 7.

FIG. 8 shows in greater detail certain ones of the circuits of blocks 500-6, 500-21, 500-26 and 500-46. Referring to the figure, it is seen that the control circuits of block 500-6 include a plurality of AND/NAND gates 500-60 through 500-74. The gates 500-60, 500-61 and 500-62 are connected to receive different ones of the ZAC command bit signals and the cache bypass signal from ZAC register 500-120. These signals are combined as shown and applied to gates 500-64 and 500-74. The resulting read load and write load command signals are applied to the cache control circuits 500-21, the directory control circuits 500-26 and the backing store control circuits 500-46 as shown. The other command signals such as RCL000 and RR100 are also applied to the backing store circuits 500-46.

As seen from FIG. 8, the cache control circuits 500-21 include series connected NAND/AND gates 500-210 and 500-212 which provide a write cache timing signal, WRCACHE100, to a write clock enable circuit 500-214. The write enable circuit 500-214 includes logic gating circuits, conventional in design, which provide the appropriate timing signals to the cache 500-20 required for its execution of a write cycle of operation. Additionally, the control circuits further include AND/NAND gates 500-216 through 500-222 which are operative to modify the state of address bit 32 as required for writing into cache a block of data from backing store 500-40.

Similarly, the directory control circuits include series connected NAND/AND gates 500-260, 500-262 and 500-264, the last of which provides a write directory timing signal WRDR100 to a write enable circuit 500-266. The write enable circuit 500-266 includes logic gating circuits, conventional in design, which provide the appropriate timing signals to the directory storage unit 500-22 required for its execution of a write cycle of operation.

The backing store control circuits 500-46 include series connected AND/NAND gates 500-460 through 500-468. These gates are operative to generate a backing store request signal BSREQ100 and enable data signal to initiate a backing store read-write cycle of operation and allow transfer of backing store data to SIU 100.

The last group of circuits in FIG. 8 constitute the hit register circuits 500-28 of FIG. 7. The circuits include NAND/AND gates 500-280 and 500-282 in addition to an AND gate 500-281 connected as shown. The NAND/AND gate 500-280 receives the resulting comparison signals from comparison circuits 500-24 and applies an indication of a directory comparison to gate 500-282. The output of gate 500-282 in turn is applied to the set input of a hit register flip-flop 500-284. A NAND/AND gate 500-284 receives an accept ZAC signal from SIU 100 which it complements and applies to a reset input of flip-flop 500-284. The binary ONE and ZERO output signals from flip-flop 500-284 are thereafter distributed to different ones of the blocks of FIG. 8 as shown.

DETAILED DESCRIPTION OF SYSTEM INTERFACE UNIT 100

Interrupt Section 102

Figure 3A:
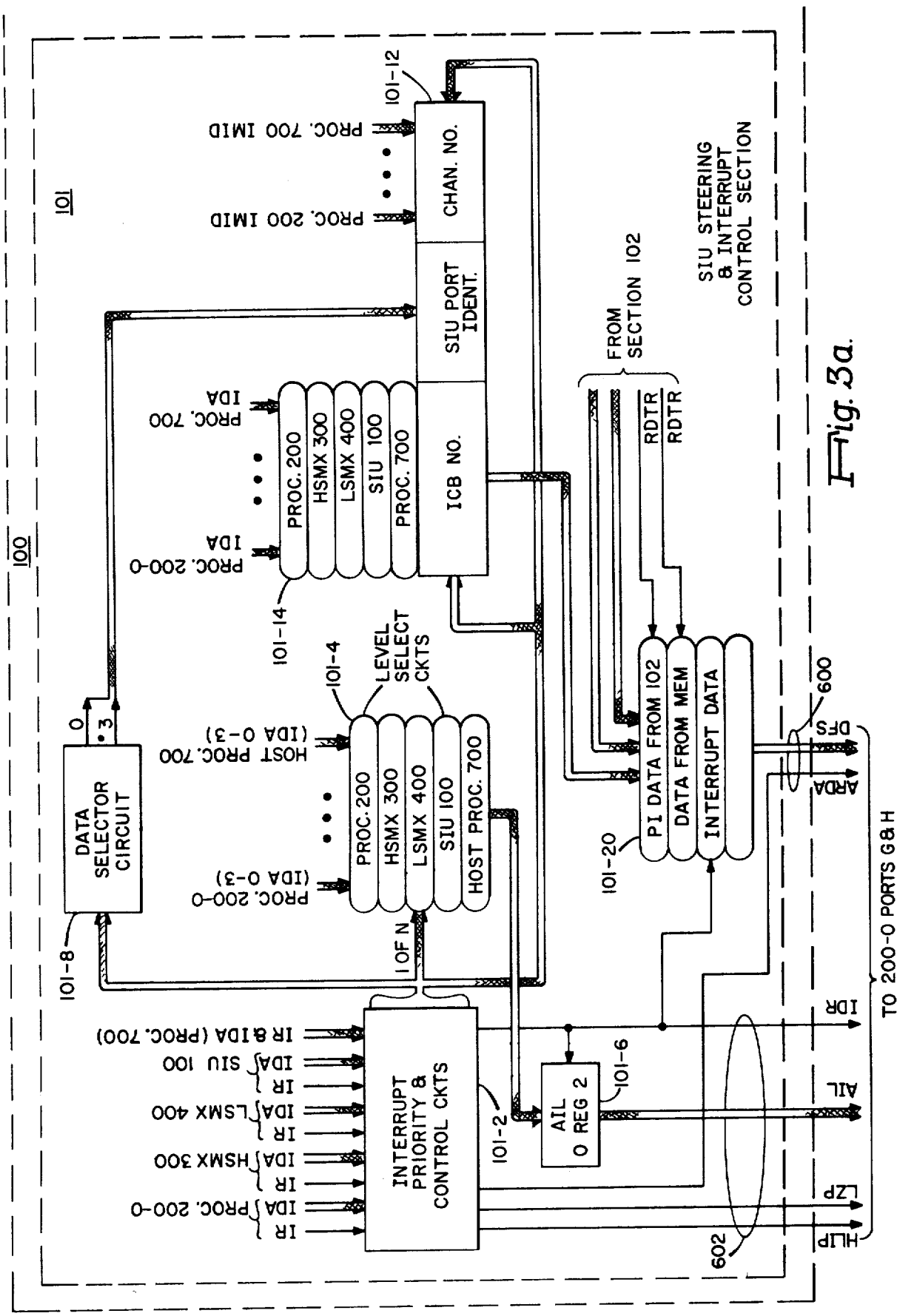
FIGS. 3a and 3b show in greater detail the system interface unit of FIG. 1.

The System Interface Unit 100 as mentioned provides for communication between modules of the system of FIG. 1 via a plurallity of crossbar switches. Separate crossbar switches are used to collect signals from the lines of each of the different interfaces of the modules. FIG. 3a shows the switches and circuits of interrupt section 102 for handling the module interrupt interfaces. In the system of FIG. 1, there are modules which connect to ports LMO, A, E, G and J, each of which applies signals to the SIU 100 via different ones of the lines of its interrupt interface 602. Additionally, SIU 100 also provides signals via an interrupt interface associated with port L of FIG. 1.

As seen from FIG. 3a, each of the modules when requesting service applies a signal on its interrupt request (IR) line together with appropriate interrupt identifier information on its IDA lines which are applied to the circuits of an interrupt priority and control block 101-2. The circuits of block 101-2 monitor all interrupt interfaces and signals the appropriate processor corresponding to processor 200 when there is a request having a priority higher than that of the process being executed. When processor 200 signals that it is able to accept the request, the SIU 100 gates the identifier information associated with the highest priority request to processor 200. The identifier information includes an eight bit interrupt control block number including a parity bit, a three bit interrupt level number and an one bit processor number with a parity bit and a four bit channel number.

Considering interrupt section 102 in greater detail, the circuits of block 101-2 include decoder circuits which decode the processor number and interrupt request signals. Providing that there is no parity error, the output signals from the decoder circuits are applied to priority logic circuits of the designated processor logic circuits. The priority logic circuits decode the interrupt level signals and determine the highest priority level and then determine the port priority so that the module having the highest priority level and highest port priority is selected. The interrupt port priority within any given level is as follows:

Old, port L; port A, port B, port C, port D; port E; port F, port G; port H; port J and port K.

This means that in the system of FIG. 1 that the port of the current process has the highest priority followed by the SIU 100, the high speed multiplexer 300, the host processor 700, the processor 200 and the low speed multiplexer 400.

The priority circuits of block 101-2 are operative to generate an output signal on one of n number of output lines, n corresponds to the number of interrupting modules within the system. The n output lines are applied to an eight position data selector switch 101-4 which selects the interrupt level signals of a level of interrupt having a priority higher than the level currently in progress to be loaded into a register 101-6. The output signals from register 101-6 are applied to the AIL lines when processor 200 forces the IDR line to a binary ONE in response to the SIU 100 having forced prior to the higher level interrupt present (HLIP) line or the level zero present (LZP) line to a binary ONE. When the current process is not inhibited from being interrupted, an interrupt request causes the processor 200 to suspend the current process and to accept an interrupt word from the SIU 100 including the identifier information mentioned previously. More specifically, the interrupt word is formatted as follows.

Bit 0 is a new interrupt bit position. When set to a binary ONE indicates that the interrupt is a new one and when set to a binary ZERO indicates that the interrupt is that of a previously interrupted process that is to be resumed.

Bits 1-17 are unused and are binary ZEROS.

Bits 18-27 define the interrupt control block number with bits 18 and 27 being set to binary ZEROS.

Bits 28-31 are generated by the SIU 100 and identify the source module as explained herein in accordance with the present invention.

Bits 32-35 are generated by the modules having multiple ports and identify the subchannel or port within the source module as explained herein in accordance with the present invention.

For more detailed information regarding the implementation of the circuits of block 101-2, reference may be made to the copending patent application titled "Priority Interrupt Hardware" referenced in the introductory portion of the specification.

It is also seen that the output lines from interrupt priority circuits 101-2 are applied to a further data selector switch circuit 101-8. Since only the requesting module having the highest priority will apply a signal to selector circuit 101-8, the selector circuit is connected to provide a predetermined wired-in set of coded steering signals which identify the physical port to which the requesting module granted priority connects (i.e. bits 28-31 of the interrupt word).

In the present embodiment, the following steering codes are generated for identifying the modules of FIG. 1.

| CODE | SIU PORT (MODULE) IDENTIFIED |
|------|------------------------------|
| 0000 | Local memory module - port LMO |
| 0001 | port K |
| 0010 | SIU 100 - port L |
| 0101 | Low speed multiplexer 40 - port J |
| 0110 | processor 200 - port G |
| 1101 | high speed multiplexer 300 - port A |
| 1110 | host processor 700 - port E. |

The four bit code generated by the selector circuit 101-8 is in turn applied to a group of conventional AND gating circuits included within a gating network 101-12. The other identifier information provided by the different source system modules are also applied to other gating circuits of network 101-12. Specifically, each module applies an interrupt control block number (ICBN) via its IDA lines to a different one of the positions of an eight position data selector switch circuit 101-14. Additionally, each module provides the information identifying the requesting subchannel or port of the source module to other ones of the gating circuits of network 101-12 via the IMID lines of the interrupt interface. When the processor 200 forces its interrupt data request (IDR) line to a binary ONE, the SIU 100 applies the signals from gating network 101-12 to the data from SIU (DFS) bus lines of the processor data interface 600 via one of the positions of a four position data selector switch circuit 101-20. The other positions of switch 101-20 are not shown since they are not pertinent to an understanding of the present invention.

Data Transfer Section 102

Figure 3B:
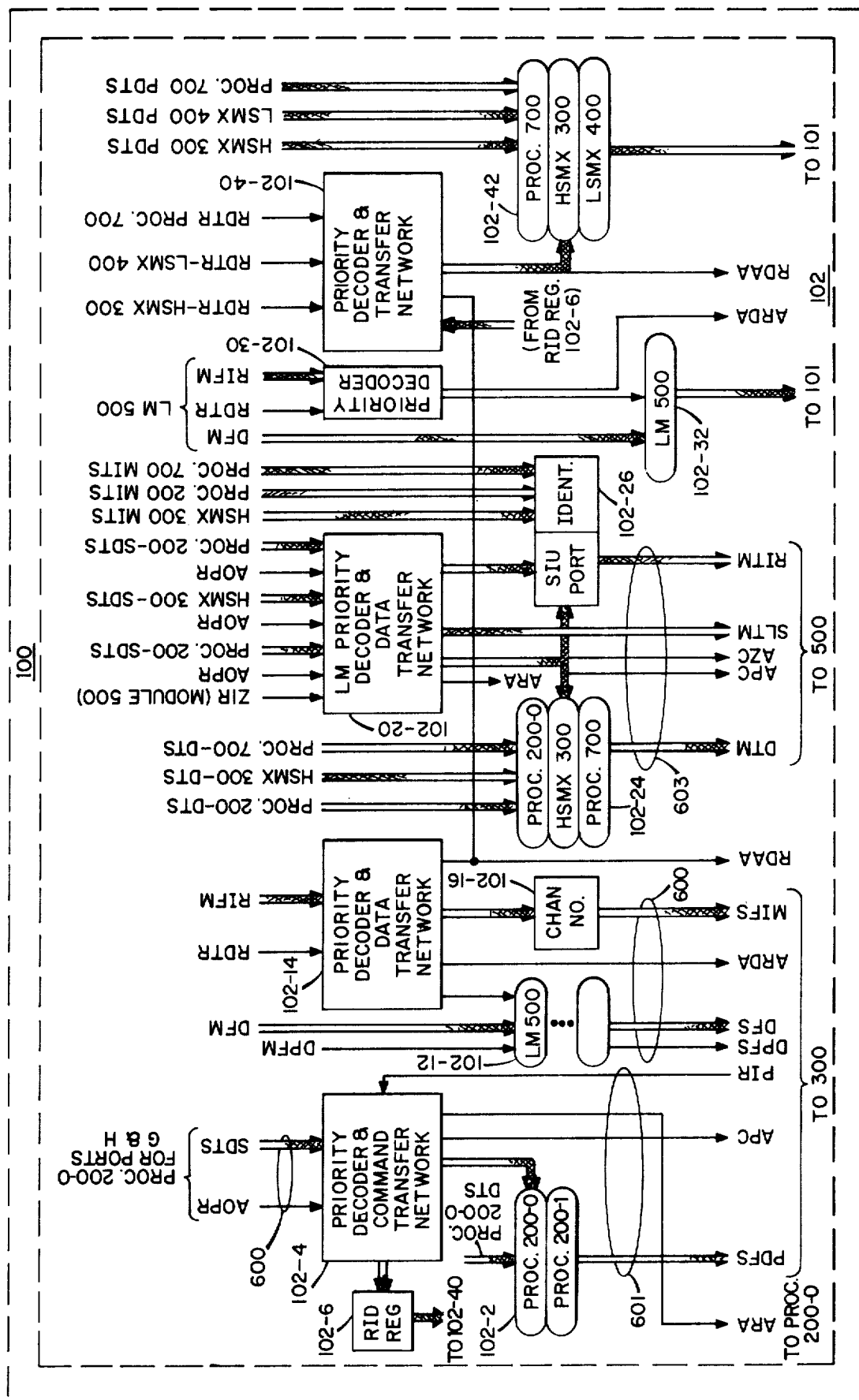

FIG. 3b shows the data transfer section 102 of the system interface unit 100. This section includes priority circuits which establishes which source module is to transfer commands to the high speed multiplexer 300 on its programmable interface 601 and which source module is to transfer data to the multiplexer 300 on its data interface 600. Additionally, section 102 includes priority circuits which determine which source module is going to transfer either data or commands to local memory module 500.

It will be appreciated that transfers between a pair of modules occurs when one module has generated a request to the other module and that the request has been accepted by the other module. In order for a request to be accepted, the requesting module must have the highest priority, both modules must be in a state to receive information and that the transfer path over which the transfer is to take place must be available (i.e. not busy).

As concerns the signals applied to section 102 by processor 200, the generation of these signals is to a large extent controlled by the different fields of the microinstructions read out into processor register 201-15 of FIG. 2. For example, the active output port request (AOPR) line from processor 200 applied to the circuits of block 102-4 is enabled in accordance with a SIU request type control bit field of each microinstruction read out to register 201-15 which is coded to define a transfer of a read/write memory or programmable interface command. The data to SIU lines (DTS) of the processor data interface 600 applied to a two position data selector switch 102-2 constitute command information generated under microprogram control which is loaded into the processor data output register 204-14 of FIG. 2. The steering data to SIU (SDTS) lines receive signals generated under microprogram control which are loaded into the processor steering register 204-16 of FIG. 2.

For the system of FIG. 1, only I/O processors transfer commands to the multiplexer 500 only and processor 200 applies signals to network 102-4. the network 102-4 therefore includes decoder circuits which decode the steering information from the processor module to establish when the module desire to transfer commands to the multiplexer 300. In the case of more than one I/O processor when more than one module desires to transfer during the same cycle, a priority network included in network 102-4 selects the module assigned the highest priority and enables the transfer of a command by that module to the multiplexer 300 on the PDFS lines of its programmable interface 601. More specifically, the network 102-4 applies signals to the two position selector switch 102-2 which selects signals from the appropriate module. This occurs when the multiplexer 300 signals the SIU 100 that it is ready to accept a command by forcing the PIR line to a binary ONE. At the same time, network 102-4 forces the APC line to a binary ONE signaling the multiplexer 300 to accept the command applied to the PDFS lines. When the processor 200 executes an instruction causing it to send a programmable interface (PI) command to the multiplexer 300, the processor 200 places the processor number identification into bit 3 of the command. The multiplexer 300 stores the processor number contained in the command until it wants to issue an interrupt request at which time the processor number is included as part of the interrupt data as explained herein. When the PI command is forwarded to multiplexer 300, the steering information identifying processor 200 as the requester is stored in a register 102-6 associated with multiplexer 300 (port A). As explained herein, when multiplexer 300 responds by generating a read data transfer request to SIU 100, the contents of register 102-6 is used to identify processor 200 as the actual module to receive the data.

A similar arrangement is employed for transferring data signals to multiplexer 300. In FIG. 1, memory module 500 is the only module which transfers data to multiplexer 300. Such transfer occurs in response to a read memory command (ZAC) forwarded to the memory module 500 by multiplexer 300 via network 102-20 as explained herein. When multiplexer 300 forwards the command, the SIU 100 generates the appropriate 4 bit requestor identifier code (steering code) which it appends to the multiport identifier information received from multiplexer 300. The information is stored by the memory module 500 and returned to the SIU 100 when the module 500 generates a read data transfer request to designate that multiplexer 300 is to receive the data. Also, when the SIU 100 accepts the request, it notifies the multiplexer 300 by forcing line ARDA to a binary ONE.

The read data transfer request (RDTR) line when set by memory module 500 signals the network 102-14 that it is ready to transfer information read out during a cycle of operation. The local memory module 500 also supplies signals to the requestor identifier from memory (RIFM) lines to identify the requesting module to which the information is to be transferred.

More specifically, circuits within a decoder network 102-14 decode the identify signals applied to the RIFM lines and when the signals indicate that the local memory module 500 is ready to transfer information to the multiplexer 300 (assumed the multiplexer 300 is ready to receive the information), the decoder network 102-14 applies the appropriate signals to the selector switch 102-12 and circuits within a gating network 102-16.

Additionally, decoder network 102-14 applies a signal to the accept read data (ARDA) line of the data interface signaling the multiplexer 300 that it is to accept the data from SIU (DFS) lines of its interface 600. The circuits of block 102-16 apply the appropriate multiport identifier information to multiport identifier from SIU (MIFS) lines identifying the requesting subchannel which is obtained from the RIFM lines. When the transfer has taken place, the network 102-14 forces the RDAA line to a binary ONE signaling the requesting module that the data has been accepted by memory module 500.

An arrangement similar to network 102-14 is used by SIU 100 to transfer PI and memory commands from any one of the modules of FIG. 1 to local memory module 500. the module 500 is operative to force either the programmable interface request (PIR) line or ZAC interface request (ZIR) line applied to a decoder network 102-20 to a binary ONE when it is ready to accept either a programmable interface or memory command. Additionally, the processor 200, the processor 700 and multiplexer 300 apply a network 102-20 signals to the active output port request (AOPR) line and steering data to SIU lines of their respective data interfaces. The network 102-20 upon decoding the steering information applied by each of the modules is operative to generate the appropriate signals to a three position selector switch 102-24 for enabling the module having the highest priority to apply signals to the data transfer to SIU lines of memory module data interface 603. It is also seen that network 102-20 applies signals to either the accept programmable command (APC) line or accept ZAC command mode (AZC) together with the appropriate requestor identification signals on the request identifier to memory (RITM) lines of the local memory module interface 603 via a gating network 102-26.

The last two networks 102-30 and 102-40 are used to transfer memory data and programmable interface data to processor 200 in response to memory commands and PI commands respectively previously generated by the processor 200. As seen from FIG. 3b, the priority decoder network 102-30 has the same input lines as network 102-14 and operates in the same manner to forward the requested memory data to processor 200 via a data selector switch 102-32 and the four position selector switch 101-20 of FIG. 3a. It will be appreciated that since processor 200 processes a single command at a time, there can be no conflict between the modules applying data to selector switch 101-20 for transfer to the processor DFS lines in response to processor requests. That is, after the processor 200 sends a command to one of the modules of FIG. 1, its operation is stalled pending receipt of the requested data. The SIU 100 upon accepting the processor's request forces the processor's ARA line which causes the processor to delay operations.

The separate network 102-40 processes return data requests from those modules responding to PI commands. The network 102-40 decodes the signals applied to the RDTR lines and from register 102-6 together with registers of the other modules, not shown. When the SIU 100 detects that module is trying to return requested data to processor 200 (i.e. requestor identifier stored in multiplexer 300 register 102-6), the network 102-40 generates signals which conditions a three position data selector circuit 102-42 to apply the signals from the PDTS lines of the PI interface of the module trying to return requested data to processor 200. These signals are in turn applied to the processor's DFS lines via selector switch 101-20 of FIG. 3a which is conditioned by the module request signal. During a next cycle of operation, the network 102-40 forces the RDAA line to a binary ONE signaling the module that the data applied to the PDTS lines has been accepted and that the module can now remove such data (i.e. clear its output register). Thus, it is seen that switch 101-20 selectively applies any one of three types of data to the DFS lines of the processor's data interface 600.

For the purpose of the present invention, the circuits included within different ones of the blocks of FIG. 3b may be considered conventional in design and include logic circuits found in the aforementioned publication by Texas Instruments Inc. Also, for the purposes of the present invention, the switching networks can comprise conventional crossbar switches.

DETAILED DESCRIPTION OF HIGH SPEED MULTIPLEXER 300

COMMON SECTION

FIG. 4 discloses in greater detail the common control section 301 and a portion of the channel adapter section 302. Referring to FIG. 4, it is seen that the common control section includes a pair of registers 301-2 and 301-5 for storing the words of a PI command received via the PDFS lines of the multiplexer programmable interface 601 through a two position data selector switch 301-1. The switch 301-1 enables PI command signals from an alternate path (i.e. DFS lines) to be loaded into registers 301-2 and 301-5. However, in the preferred embodiment, only the PDFS position will be used. It is also seen that a register 301-40 receives via driver circuits 301-3 memory data applied to the DFS lines of the multiplexer data in interface 600.

The command signals from both registers 301-2 and 301-5 are selectively applied via a two position data selector switch 301-6 of the four channel adapter sections via driver circuits of block 301-8. Also, the command signals can be selectively applied to one position of an eight position data selector switch 301-20 via a two position data selector switch 301-42. The same switch 301-42 also applies the data signals from register 301-40 to each of the four channel adapter sections via driver circuits of block 301-43.

A pair of parity check circuits 301-45 and 301-49 perform a check upon the contents of registers 301-2, 301-5 and 301-40 and apply signals representative of the results to the circuits of block 301-4 which provides status signals applied to C switch 301-50. These circuits comprise logic circuits, conventional in design, which combine signals from register 301-2 with signals from the channel adapter sections to generate control signals necessary for executing the commands received from processor 200.

Additionally, the signals from register 301-5 can also be loaded into a selected one of the plurality of registers of blocks 301-10, 301-12 and 301-14 via driver circuits of blocks 301-8, 301-15 and 301-16. The block 301-10 comprises four 8 bit registers, conventional in design, which may take the form of registers disclosed in the aforementioned Texas Instrument publication (e.g. TI 7481). Output signals from each of these registers can be selectively applied as an input to an interrupt position of selector switch 301-20 together with the corresponding signals from a four position selector switch 301-30 and an eight position selector switch 301-32. The contents of the ICB, level and mask registers of the channel adapter sections can be read during the performance of testing and verification operations in response to PI commands.

Additionally, the interrupt control block registers of block 301-10 are selectively connected to a 14 bit interrupt data (IDA) register 301-22 in response to signals generated by an interrupt level priority network 301-24. Groups of bit positions of each of the 24 bit level registers of block 301-12 are applied to corresponding positions of a different one of the 8 position multiplexer selection switches 301-26 through 301-28. It is also seen that each of the level registers of block 301-12 connect to different positions of the four position selector switch 301-30 and eight position selector switch 301-32. It is also seen that each of the 8 bit mask registers of block 301-14 connect to different positions of the four eight selector switch 301-32 and to the interrupt enable priority and type logic circuits of block 301-34.

As seen from FIG. 4, the circuits of block 301-34 receive groups of interrupt request signals from channel adapters in addition to groups of interrupt signals generated by the controller adapters attached to the channel adapters. More specifically, each CA channel can generate four different types of interrupt requests. They include a fault interrupt caused by setting of a parity error indicator bit within a common status register, not shown, which can be considered as part of block 301-4, a data control word (DCW) interrupt, a programmable interrupt, and an exception interrupt produced by the detection of an illegal command etc. The fault interrupt is made common to each channel so as to have one input to block 301-34 which is the same for all four channels.

Each controller adapter can also generate four different types of interrupt requests which are dependent upon the type of device connected to the adapter. In the case of a disk device, the types of interrupt requests include: a fault interrupt caused by detection of parity errors, a rotational position sensed interrupt, a data transfer termination interrupt and an off-line interrupt caused by completion of an off-line operation such as a seek operation. The four types of channel interrupt requests and the four types of CA interrupt requests together provide a group of eight types per CA channel designated as events EV0 through EV7. Each type of interrupt request is assigned a three bit type number such that the four channel types of interrupt requests are numbered 0-3 corresponding to EV0-EV3 while the four controller adapter types of interrupt requests are numbered 4-7 corresponding to EV4-EV7. The events having the lowest codes have the highest priority (e.g. 000 = highest priority = EV0 = fault interrupt and 111 = lowest priority type = EV7 = off-line interrupt). The priority for the different types of interrupt requests is fixed and is determined by the type number. Each of the channels provide 7 interrupt requests inputs to block 301-34 together with the common fault input provided by block 301-4.

The circuits within block 301-34 logically combine the signals from each of the mask registers of block 301-14 with the interrupt request signals from each channel and adapter and select the interrupt type having the highest priority for each channel. The three bit type code for each channel is applied to a corresponding one of the multiplexer selector circuits 301-25 through 301-28. The sets of type codes generated by block 301-34 are also applied as inputs to corresponding ones of the positions of a four position level/type selector switch 301-35.

Each of the multiplexer circuits 301-25 through 301-28 upon being enabled by the circuits of block 301-34 provide an appropriate three bit level code as an input to an interrupt level priority network 301-24. The network 301-24 generates signals on a pair of lines which connect as control inputs to the ICB registers of block 301-10, the switch 301-35 and a four position interrupt multiport identifier IMID switch 301-36. The signals generated by network 301-24 designate the channel or port having the highest priority. In the case where more than one channel has the same priority level, the circuits of network 301-24 select the channel assigned the lowest channel number (i.e. CAO = λ OOXX = highest priority, CA3 = 11XX = lowest priority). In those instances where the controller adapters employ subchannels or subports, a pair of lines from the CAI provide signals to the low order two bit positions, of switch 301-36. The high order 2 bit positions of the switch are permanently with the corresponding channel adapter number (e.g. 00 = CAO etc.). The output of switch 301-36 is applied to IMID register 301-23 as depicted in FIG. 4a.

The output signals from the selected ICB register of block 301-10, the level signals from the selected multiplexer circuits and the type signals from block 301-34 are merged into the IDA register 301-22. Also, these signals are applied to the parity generator circuits of a block 301-37 which generates a pair of odd parity bits for the signals stored in the register 301-22. A further flip-flop 301-21 which can be considered part of register 301-22 receives a signal from the circuits of block 301-34 to indicate the presence of an interrupt request.

As seen from FIG. 4, data signals stored in bit register 301-40 are applied via the H register position of two position data selector switch 301-42 to a two position channel write (CW) switch 301-44. The first position of the switch 301-44 when selected loads one of the four groups of channel adapter port registers 301-46 selected in response to signals generated by priority select and control circuits of block 301-48. The circuits of block 301-48 which receive input signals from registers 301-2 and 301-68 and the channel adapters shown apply output signals to the lines and output register 301-65. The registers of group 301-46 include a 40 bit register for storing a list pointer word (LPW) for the port associated therewith, a 40 bit DA register for storing the address of data to be read or stored and a 40 bit register DT for storing tally and control information relating to a current data transfer operation. The same registers of the four channel adapter sections connect to different positions of a four position data selector switch 301-50 which receive control signals from the circuits of block 301-48. The output signals from switch 301-50 are applied to a pair of adder networks 301-52 and 301-54 in addition to a parity check circuit 301-56 operative to check the contents for errors. The adder network 301-52 is operative to update the contents of the register selected via switch 301-50 while the adder network 301-54 applies output signals to a parity generator circuit 301-58. The signals from the circuits 301-52 and 301-58 are returned to the selected register via the update network position of switch 301-44.

As also seen from FIG. 4, the output signals of switch 301-50 are applied selectively to an 8 bit steering register 301-60 via a steering switch 301-59 and to the DT switch 301-20. Each of the data selector switches 301-59 and 301-61 receives output signals from DT switch 301-20 which in addition to the sources mentioned is connected to receive data signals from the DF lines of each of the channel adapter sections CA0-CA3. The output signals from DT switch 301-20 and ZAC switch 301-61 are applied to a parity generator and check circuit 301-62 and to the bank of registers of block 301-64. Additionally, switch 301-61 is connected to receive zone and command information derived from channel adapter service lines applied to block 301-4 when the multiplexer 300 is being operated in a particular mode not pertinent to the present invention. The four registers of block 301-64 designated as ZAC, PDTS, Data 1 and Data 2 respectively store memory command signals, PI data signals and channel adapter data signals. The output signals from these registers are applied either to the lines DTS of the multiplexers data interface 600 or the PDTS lines of the multiplexers interface 601. When the ZAC register of block 301-64 is loaded, this causes an AOPR flip-flop 301-65 to be switched to a binary ONE which signals the SIU 100 that the multiplexer 300 is requesting a path over which it can transfer a memory (ZAC) command and data. The appropriate memory steering information applied via switch 301-59 will have been stored in register 301-60 and a parity check and generator circuit 301-66 is operative to generate odd parity for the steering information.

DESCRIPTION OF OPERATION

The operation of the system of the present invention will now be described with reference to FIGS. 1 through 11. As seen from FIG. 9, the local memory module 500 is capable of carrying out a number of different types of ZAC commands. Briefly, the module 500 is capable of processing 5 different types of ZAC commands which are defined as follows:

1. Read Single — the contents (one word) of the addressed memory location are read and transmitted to the requester. Memory contents are not altered. ZAC bit 9 defines whether cache is to be loaded or bypassed. However, if that block is already loaded in the cache, the read cycle is done in the cache and the information is taken from cache.
2. Read-Clear Single — the contents (one word) of the addressed memory location are read and transmitted to the requester and the memory location (one word) is cleared to zeros with good parity (or EDAC) bits. The data block containing the addressed word is not loaded into the cache. If that block is already loaded in the cache, the addressed word is also cleared to zeros in the cache.
3. Read Double — the contents of the addressed pair of memory locations (two words) are read and transmitted to the requester word serially. Memory contents are not altered. ZAC bit 9 defines whether cache is to be loaded or bypassed. However, if that block is already loaded in the cache, the read cycle is done in the cache and the information is taken from cache.
4. Write Single — one to four bytes of the data word supplied by the requester are stored in the addressed memory location. The bytes to be stored are specified with the zone bits. Zone bits 5, 6, 7 and 8 control bytes 0, 1, 2 and 3 respectively. The memory contents of byte positions that are not to be stored remain unaltered.
5. Write Double — the two data words supplied by the requester are stored in the addressed pair of memory locations.

The specific codes for the different ZAC commands are as follows. The other possible eleven codes are defined as being illegal and produce an error signal as explained herein.

| CMD | ZONE | | | | CACHE BYPASS BIT | |
|---|---|---|---|---|---|---|
| 1 2 3 4 | 5 | 6 | 7 | 8 | 9 | |
| 0 0 0 0 | 0 | 0 | 0 | 0 | 1/0 | Read Single |
| 0 0 1 0 | 0 | 0 | 0 | 0 | — | Read Clear Single |
| 0 1 0 0 | 0 | 0 | 0 | 0 | 1/0 | Read Double |
| 1 0 0 0 | 1/0 | 1/0 | 1/0 | 1/0 | — | Write Single (Zoned) |
| 1 1 0 0 | 1 | 1 | 1 | 1 | — | Write Double |

By way of example, it is first assumed that one of the processors 200 of pair P0 is operative to begin execution of a series of program instructions specifying the referencing of local memory module 500. In this example, the first and successive instructions are formatted to include at least one field specifying a general register which stores an index value and another field including an address syllable. The general register index value contents defines the state of bypass bit 9 which is assumed to have been set to a binary ZERO. The processor 200 combines the information to produce an absolute address.

Once the absolute address has been calculated, the processor 200 generates the required memory command word and appropriate SIU steering information for directing the command to local memory module 500. The steering and command have the formats shown in FIG. 9.

Considering the above in greater detail, the op code of each instruction is coded to specify a memory reference operation performed by the generation of a ZAC command. The op code of the first instruction is applied by instruction register switch 202-4 to memory 201-2 which causes the memory to reference one of the locations. The contents of the location are read out into register 201-4 and include a pair of addresses specifying the storing addresses in control store 201-10 of the microinstruction sequences required for instruction processing.

During a first phase of instruction processing which begins during the execution of a current instruction, the index bits of the next instruction are used to address a specified one of the general register locations of scratch pad memory 203-10 via position 3 of switch 203-14 (i.e., Lev, XR1). The contents of the location are read out to buffer 203-16.

The contents of the index register are applied via position 0 of switch 203-20 to the A operand input of adder 204-2 which the displacement field of the instruction is applied via position 0 of switch 204-1 to the B operand input of adder 204-2. The two are added together and the result is transferred to working register R2 via switch 204-8. When there is a second level of index specified, a similar operation is performed which adds the value stored in the second general register location to the previously stored result in register R2. It will be readily appreciated that the appropriate value for bit 9 could have been stored in the second general register rather than in the first general register.

During the execution phase of the instruction, the processor 200 operates to generate a ZAC command to local memory 500 specifying a read operation and apply the appropriate memory address obtained from either memory 204-4 or R2 register. Assuming an absolute address, the address from register R2 is applied to the WRP bus and loaded into the data out register 204-14 via the R/W position of address switch 204-6 and cross bar switch 204-8.

The steering switch 204-10 provides the SIU steering for the memory cycle of operation. The signals have the format of FIG. 9 and provide information for use by SIU 100 for transferring the R/W command to local memory module 500 or to port LM0 to which the module 500 connects. They are loaded under microprogram control from register 201-15 and from address switch 204-6 via the R/W position of steering switch 204-10 into bit positions 0-8 of steering register 204-16.

For further information regarding the coding of microinstruction fields and the generation of steering information, reference may be made to the copending applications "Pathfinder Microprogram Control System" and "Memory Access System" respectively.

Following the loading of both registers 204-4 and 204-16, the processor 200 forces the AOPR line to a binary ONE which begins the signal sequence for transfer of the R/W command to local memory module 500. Also, the processor 200 increments the instruction counter (IC) and stores the result in working register R3. Then the processor 200 delays execution of the next microinstruction until it receives a signal via the ARA line from the SIU 100 indicating the acceptance of the request.

The SIU 100 views the R/W command as requiring a pair of SIU cycles, an address/command cycle followed by a data cycle. Assuming that the local memory module 500 is ready to accept the command, the ZIR line is a binary ONE (in FIG. 11 the waveforms are shown in terms of negative logic signals). The SIU priority network 102-4 of FIG. 3b is operative to apply the command word via a SIU selector switch to the DTM lines of the local memory interface 602 during a cycle of operation. The processor 200 waits holding the information in the data out register 204-14 until the SIU 100 forces the ARA line to a binary ONE. Simultaneously, the SIU 100 switches the AZC line to a binary ONE signalling the module 500 to accept the R/W command (see FIG. 11).

Upon detecting the change of state in the ARA line, the processor 200 under microinstruction control completes the processing of the instruction. That is, the processor 200 waits until the data word(s) requested has been received from SIU 100 as explained herein.

Here it is assumed that the memory command is coded to specify a read single operation with bypass bit 9 coded to specify that cache 500-20 not be bypassed but be loaded (i.e., bit 9 = 0). As discussed above, the state of bit 9 controls the loading of cache 500-20 in the case of read single and read double commands.

Figure 11:
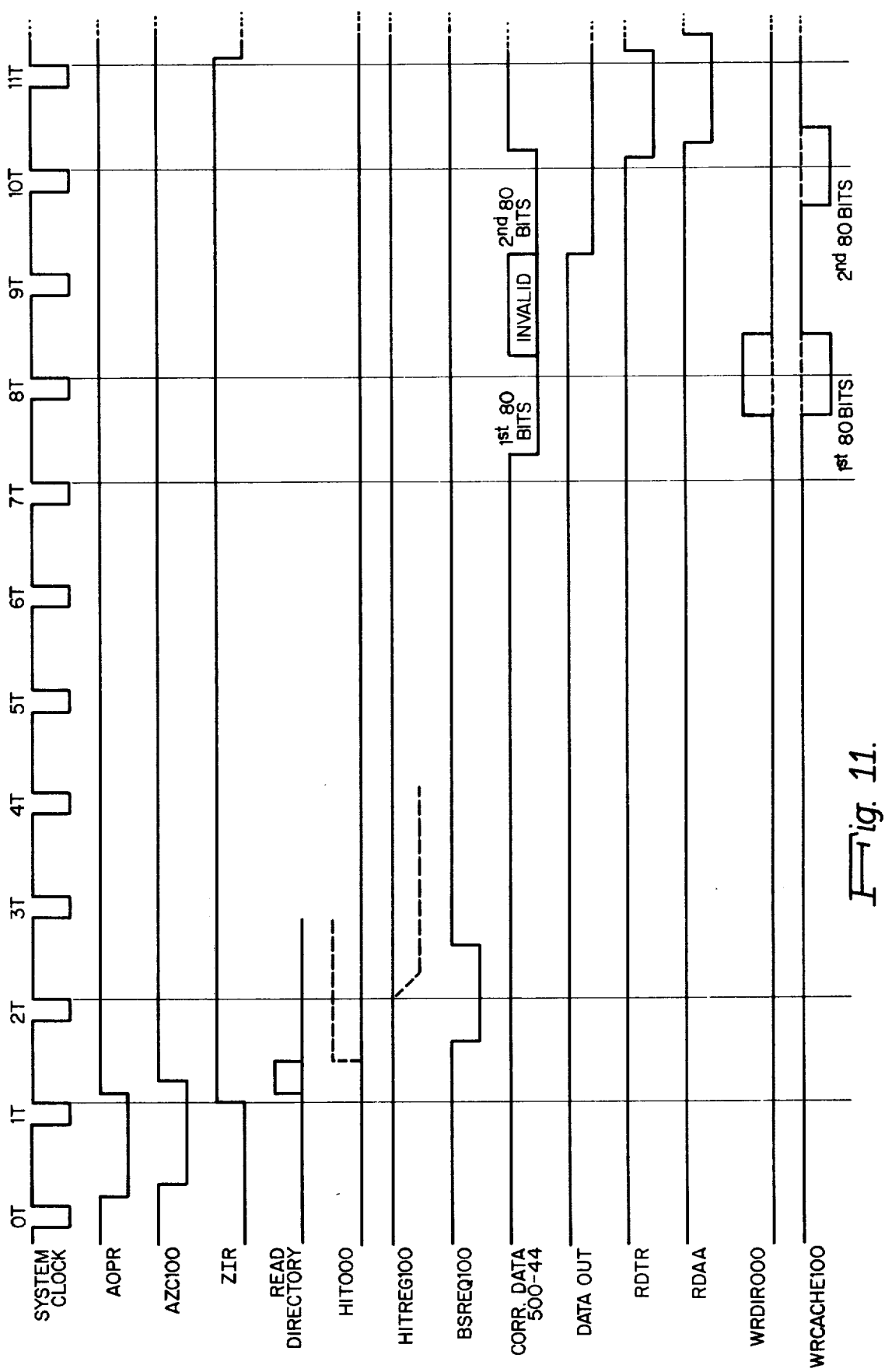
FIG. 11 is a timing diagram used in explaining the operation of the present invention.

Referring to FIGS. 11 and 7, it is seen that the command and address data of the ZAC command word are loaded into ZAC register 500-120 in response to signal AZC100 from the AZC line at time 1T (i.e., trailing edge when system clock pulse 1T switches from a binary ONE to a binary ZERO). The address signals from the DTM lines 17-33 stored in ZAC register 500-120 are applied as inputs to the directory storage unit 500-22 and to the directory comparison logic circuits 500-24 as shown in FIG. 7.

More specifically, the address signals applied to DTM lines 26-32 are used as a block address for addressing the directory storage unit 500-22 while the address signals applied to lines DTM 17-25 correspond to the signals to be written into directory storage unit 500-22 in the case of a directory write operation. The same address signals applied to the directory comparison circuits 500-24 are used for establishing whether the block of data already resides in cache 500-20.

It will be also noted that the address signals applied to lines DTM 17-33 are also applied to backing store 500-40 for read out of a block of data therefrom when the data is not found to reside in cache 500-20.

From FIG. 11, it is seen that a search of the directory storage unit 500-22 is immediately initiated to determine if the information requested has already been stored in cache 500-20. The search operation is performed during the interval between clock pulses 1T and 2T. In this example, it is assumed that none of the information requested by processor 200 resides in cache 500-20.

Referring to FIG. 8, it is seen that the circuits of block 500-6 decode bits 1-4 and 9 of the ZAC command. Since bits 1-4 and 9 are all binary ZEROS, signals RCL000 and WR000 are both binary ONES. Hence, gate 500-61 forces signal RR100 to a binary ONE indicating the presence of a read command. This signal is applied as an input to gates 500-62 and 500-460.

It will be noted that the NOLOAD000 signal applied to gate 500-62, representative of the complement of the state of bypass bit 9, is a binary ONE. The signal LME/DE000 is normally a binary ONE in the absence of a local memory error or a directory error. Since it is assumed that the information being requested is not in cache 500-20, signals HIT000 and HITREG100 correspond to a binary ONE and a binary ZERO respectively (i.e., no hit detected). Backing store timing signal BST8000 is a binary ZERO during timing pulse T8 which causes gate 500-68 to force signal RDLDT100 to a binary ONE. Accordingly, gate 500-62 forces signal RDLOAD100 to a binary ONE.

The signals RR100 and HIT000 condition gate 500-460 to force the read or miss signal RD/MISS000 to a binary ZERO. This causes gate 500-462 to force the backing store command signal BSCMD100 to a binary ONE. Assuming the read command is valid (i.e., correct code and format), signal TCERROR000 is a binary ONE. Accordingly, upon the occurrence of backing store timing signal SLO4T/NSLO2T100, gate 500-464 is operative to force the backing store request signal BSREQ100 to a binary ONE during the interval between timing pulses 1T and 2T (see FIG. 11). This signals the backing store 500-40 to initiate a memory cycle of operation.

In response to such request, the backing store 500-40 is operative to read out a 160 bits of data into output register 500-42. The data appears in correct form at the output of the circuits 500-44 prior to the occurrence of timing pulse T7 as shown in FIG. 11. Upon the occurrence of backing timing signal BS8T101 from clock circuits 500-48, signal RDLOAD100 causes gate 500-260 to force write directory signal WRDIR000 to a binary ZERO. This in turn causes gate 500-262 to force enable directory write signal ENABDIRWR100 to a binary ONE when the directory clear signal DRCLR000 is a binary ONE. This signal is a binary ONE except when the director storage unit 500-22 is being cleared (see U.S. Pat. No. 3,845,474 regarding clearing operations).

The gate 500-264 forces the write directory signal WRDIR100 to a binary ONE upon the occurrence of directory clocking signal CLKDIR100 as seen from FIG. 11.

The signal WRDIR100 enables the directory write gating circuits 500-266 to apply appropriate timing signals to the circuits of each directory level. This enables the address signals applied to the directory storage unit 500-22 lines DTM 17–25 to be written into the location specified by the address signals applied via lines DTM 26–31.

It will be noted from FIG. 11 that during the same time interval that the first 80 bits read out from backing store 500-40 are written into cache 500-20. More specifically, the cache write enable circuits 500-214 are conditioned by the write cache signal WRCACHE100 during timing pulses 8T and 10T as seen from FIG. 11. That is, signal MISS100 is a binary ONE in the absence of a "hit". Timing signal BST10101 from backing store circuits 500-46 is a binary ONE during timing pulse T10. Accordingly, gate 500-68 forces signal RDLDT100 to a binary ONE during timing pulse T8 when backing store signal T8000 is a binary ZERO and during timing pulse T10 when signal LDSCND80000 is a binary ZERO.

Gate 500-62 forces signal RDLOAD100 to a binary ONE which in turn causes gate 500-74 to force signal RDLOADT000 to a binary ZERO. Accordingly, gate 500-210 forces write cache signal WRCACHE100 to a binary ONE during the time intervals 8T and 10T. Thus, gate 500-210 is operative to force the write cache signal WRCACHE100 to a binary ONE upon the occurrence of cache timing signal CLK141 as seen from FIG. 11. It will be noted that since this is a read command, signal WRLOAD000 can be disregarded (i.e., a binary ONE).

Similar to the write directory signal WRDIR100, the write cache signal WRCACHE100 conditions the cache write enable circuits 500-214 to generate timing signals which are applied to the various cache sections.

During timing pulse T8, the first 80 bits corresponding to signals RD00-RD71 and RDP0-P7 are applied via input switch 500-8 and written into the column specified by the address signals applied to lines DTM 26–31. At this time, address bit 32 is a binary ZERO. Before timing pulse T10, address bit 32 is complemented and during timing pulse T10 the upper 80 bits contained in register 500-42 are applied via switch 500-8 and written into cache 500-20. The state of address bit 32 is manipulated by the circuits 500-216 through 500-222 so as to enable the entire 160 bits corresponding to a block of data to be written into cache 500-20.

This is accomplished by the complementing of the lower 80 bit signal LWR80100 from backing store control circuits 500-46. More specifically, when signal LWR80100 is a binary ONE (writing lower 80 bits), gate 500-218 forces signal RDLDIV80000 to a binary ONE. The gate 500-222 causes address signal CAADDR32100 to assume the state address signal stored in ZAC register 500-120. That is, when address bit 32 is a binary ONE, signal CAADDR32100 is a binary ONE. However, when signal LWR80100 is forced to a binary ZERO (writing upper 80 bits), signal RDLDIV80000 is forced to a binary ZERO. Here, address signal CAADDR32100 is forced to a binary ZERO.

The data is applied as an input to output switch 500-10. The output switch 500-10 is enabled by the enable signal ENABBSDATA100 which is forced to a binary ONE by gate 500-468 in response to signals HITREG000 and BSRD100. Additionally, the circuits 500-6 apply appropriate select signals to switch 500-10 for determining which word of the 160 bits is to be transferred to processor 200. The select signals are derived by detecting address signals 32 and 33 stored in ZAC register 500-120. The data is applied to the DFM lines during timing pulse T10 as shown in FIG. 11.

The local memory module 500 is operative to force line RDTR to a binary ONE signalling the SIU 100 that the data previously requested by a ZAC command is available when the processor 200 has accepted the data following the establishment of a data path signalled by ARDA forced to a binary ONE, SIU 100 forces the RDAA line to a binary ONE. This signals the local memory module 500 that the data has been accepted and that it may remove the data from the DFM lines.

It will be noted from FIG. 11 that as the requested backing store data is being forwarded to processor 200, a block of data identified by the requested data is also being written into cache 500-40 as a consequence of bypass bit 9 having been set to a binary ZERO.

As seen from FIG. 11, the entire 160 bits are written into cache 500-20 prior to the beginning of a next memory cycle of operation.

It will be appreciated that in the case of a directory compare (i.e., a hit) wherein the information requested by processor 200 resides in cache 500-20, signal HIT000 will be a binary ZERO. This signal in effect exhibits the circuits 500-46 from switching the backing store request signal BSREQ100 to a binary ONE. At the same time, signal HITREG100 is a binary ONE which forces signal MISS100 to a binary ZERO.

Hence, signal RDLOAD100 remains a binary ZERO. This prevents the enable write directory signal ENABDIRWR100 and the write cache signal WRCACHE100 from being forced to binary ONES during timing pulse T8. When the appropriate cache 1 of 8 selector circuits are conditioned by circuits 500-6, the data word read from cache 500-20 is applied via switch 500-10 and the DFM lines to SIU 100. In the manner previously described, the data word is forwarded to processor 200.

In the example given, the read memory command had bypass bit 9 set to a binary ZERO. It will be appreciated that in some instances, the processor 200 desires not to have the information it requests written into cache 500-20. An example of this is where the processor 200 issues a memory command for read out of a list pointer word (LPW) stored in backing store 500-40 in order to access a data control word (DCW).

Before considering the above, reference is first made to FIG. 6. This figure shows in diagrammatic form, the tables and lists containing LPW's and DCW's. Briefly, this information is required for the execution of peripheral commands. The peripheral commands called instruction DCW's are stored in an IDCW table. The table is related to the other table (DCW) which stores the list of DCW's which are pointers to the information areas in local memory 500. Each IDCW includes a six bit device instruction code specifying the type of operation (e.g., read, write, seek, etc.) and a six bit device code specifying the particular device. Each DCW has two words, the first includes control information while the second contains a word address. FIG. 10a illustrates the format of the two words. The format of the LPW is also shown in FIG. 10a.

It is seen from that figure that each LPW and each DCW word address includes a bit (i.e., bit 9 and bit 45) which can be used by processor 200 or multiplexer 300 as explained herein for setting the state of cache bit 9 during the generation of a memory command.

By way of example, it is assumed that processor pair 200-0 next executes memory instructions for accessing an entry within a specific DCW list. As seen from FIG. 6, the processor pair 200-0 must first fetch the LPW address from one of the IDCW tables. The memory reference instruction to be executed includes two index values. The first index value is coded to specify a general register which stores the base address of the particular IDCW table. The second index value is coded to specify a general register which an entry number for referencing a particular LPW within the IDCW table.

It will be appreciated that one of the index values has bit 9 set to a binary ONE. Since the processor pair 200-0 does not want the LPW being fetched from backing store 500-40 to be written into cache 500-20, it will not change the state of bit 9. In the manner previously described, processor 200 under microprogram control, is operative to generate another ZAC read single memory command in which bit 9 is a binary ONE. Again, the ZAC command and the appropriate steering information are loaded into data out register 204-14 and steering register 204-16 respectively.

The SIU 100 is operative to transfer the ZAC command to local memory module 500. Referring to FIGS. 7 and 8, it is seen that the ZAC command and address is stored in ZAC register 500-120 thereafter decoded. Since the memory command is a read single command, the signals applied to lines DTM01 through DTM04 are binary ZEROS. Hence, signal RR100 is again forced to a binary ONE. However, since the cache bypass bit applied to line DTM09 is a binary ONE, the signal NOLOAD000 is forced to a binary ZERO.

It is seen from FIG. 8 that the binary ZERO state of signal NOLOAD000 inhibits gate 500-62 from forcing signal RDLOAD100 to a binary ONE. Hence, during the occurrence of timing pulse T8, the write directory signal WRDIR000 remains a binary ONE. This causes gate 500-262 to maintain the enable directory write signal ENABDIRWR100 to a binary ZERO. Hence, timing signal WRDIR100 is not applied to the circuits 500-266. Accordingly, the directory write enable circuits 500-266 are not enabled thereby preventing the directory write operation from taking place.

Similarly, the cache write enable circuits 500-214 are disabled by signal RDLOAD100 being set to a binary ZERO. That is, signal RDLOADT000 is a binary ONE when signal RDLOAD100 is a binary ZERO. This, in turn, causes gate 500-210 to maintain the write cache signal WRCACHE100 at a binary ZERO thereby preventing the application of timing signal WRCACHE100 to circuits 500-214. Hence, the cache write circuits 500-214 are not enabled thereby preventing a cache write operation from taking place.

It will be appreciated that the directory storage unit 500-26 is still searched notwithstanding the fact that cache bypass bit 9 is a binary ONE. Of course, if a "hit" is detected, the specified data word will be read from cache 500-20 and transferred to processor 200.

In the event of a "miss", it is seen from FIG. 8 that gate 500-464 is operative to force the backing store request signal BSREQ100 to a binary ONE. Thereafter, in the manner previously described, the requested data word read out from backing store 500-40 is transferred to processor 200. However, since the signals WRDIR000 and WRCACHE100 are not generated, as indicated by the dotted lines in FIG. 11, no information will be written into cache 500-20.

When the processor 200 obtains the LPW address information from SIU 100, normally bit 9 will be set to a binary ONE. Since the processor 200 does not want the DCW to be loaded into cache 500-20, it will leave bit 9 unchanged. Thus, during the execution of a next instruction, the processor 200 is operative to generate a ZAC memory command which includes the LPW address and which has bypassed bit 9 again set to a binary ONE. In the manner described above, the local memory module 500 is prevented from writing the information read from backing store 500-40 into cache 500-20. In those instances where processor 200 desires access to additional data words located in the same block as the data word being requested, it will be operative to have the cache bypass bit within each ZAC memory command it generates set to a binary ZERO.

From the above, it is seen that the arrangement of the present invention enables the processor 200-0 to control on a command basis what information fetched from backing store 500-40 is to be written into cache 500-20. Additionally, the arrangement of the present invention also enables multiplexer 300 to control on a command basis what information is to be written into cache 500-20. That is, during the execution of write data transfer operations, multiplexer 300 is required to generate ZAC memory commands which it presents to SIU 100 as explained herein.

It is assumed by way of example that the operating system desires to perform a short read operation involving one of the channels of multiplexer 300 (e.g. CA0) and thereafter perform certain operations upon the same information.

To initiate channel operation, the processor 200 executes an instruction which generates a PI command specifying the loading of the LPW register of the channel (i.e., CA0). Referring to FIG. 4a, it is seen that the command word is loaded into PC register 301-2 and conditions the circuits of block 301-4 to generate signals which transfer the data word contents of the PD register 301-5 via the PD positions of switch 301-6 snd 301-42 and the HSW position of CW switch 301-44 into the LPW register of the channel selected in response to stored signals in PC register 301-2.

The LPW register now contains an address which points to the list of DCW's. Following the loading of the channel LPW register, the processor 200 executes another instruction which generates a PI command specifying a load control operation which indicates that the data word stored in the PD register 301-5 is going to be ignored.

The command word stored in PC register 301-2 conditions the circuits of block 301-4 to generate signals which transfer signals from PC register 301-2 via the PC position of PD switch 301-6 and the DTA position of WD switch 302-4 into a group of channel control flip-flops (not shown). One of the flip-flops (an AUTO flip-flop) when set, signals the channel to start transferring data.

The AUTO flip-flop causes a first list signal to be applied as one of the four inputs to the priority select and control circuits 301-48 together with a service request signal to one of the pair of two request lines from the channel. The circuits 301-48 select the channel having the highest priority of those requesting service which in turn causes the four inputs to the channel to define which of the registers are to be selected. The priority circuits 301-48 encode the CA0 service request signal into a 2 bit code (CA0=00) which is applied to circuits 301-4. Assuming no other operation in process which prevents granting of the request (i.e., no data being transferred from memory module 500), circuits 301-4 apply enabling signals to circuits 301-48. The circuits 301-48 are operative to apply a binary ONE signal to the service ANS line of channel CA0. This signal readies the channel CA0 for the data transfer.

The list signal forwarded from the channel CA0 via the circuits 301-48 causes the circuits 301-4 to select the LPW position of C switch 301-50. Signals corresponding to the two bit channel code and the list signal are loaded into the first three bit positions of register 301-65. The two high order bit positions of the register 301-65 identify the channel requesting data. As seen from FIG. 4a, the contents of register 301-65 are applied to the MITS lines. Signals from the channel select lines from 301-48 cause the selection of the LPW register for the channel CA0.

The address in the LPW register is loaded into the ZAC register of bank 301-64 selected in response to signals from circuits 301-4 via the CSW position of the DT switch 301-20 selected in response to signals applied by the circuits 301-48. Additionally, the circuits 301-48 apply signals via the zone/CMD switch position of the ZAC switch 301-61 which are loaded into the first byte position of the ZAC register. This results in the formatting of a ZAC command word such as is shown in FIG. 9. The signals applied from different ones of the four channel inputs (e.g. direct or indirect mode, read or write command, single or double precision and list) define the state of the command portion of the ZAC command word. Since multiplexer 300 generates only ZAC commands, bit position 0 of the ZAC register is at ZERO. Also, since this is a list service, the bits of the command portion are coded to define a read double precision command. Since it is not desired to have the DCW information read out from local memory module 500 using the LPW address stored in cache 500-20, bit 9 of the LPW address is normally set to a binary ONE. Thus, the cache bypass bit 9 of the ZAC command stored in the ZAC register is set to a binary ONE.

During the loading of the ZAC register, the LPW address is applied to the pair of adder networks 301-52 and 305-54 where it is incremented by 2 (2 words or 8 bytes), new parity is generated and the result is returned to the channel LPW register via the update position of CW switch 301-44. Additionally, the steering information included within the LPW register is loaded into steering register 301-60 via the CSW position of steering switch 301-59. The loading of the ZAC register caused AOPR flip-flop 301-69 to be switched to a binary ONE.

The multiplexer 300 waits until the SIU network 102-20 of FIG. 3b accepts the request signalled by the AOPR line by line ARA being forced to a binary ONE. When the SIU 100 has accepted the request from multiplexer 300, it forces the AZC line to a binary one which directs module 500 to initiate a data read/write cycle of operation. As indicated in FIG. 11a, coincident with setting the AZC line, the requester I.D. signals, the ZAC command signals and double precision signal originating from multiplexer 300 are applied to the RITM lines, the DTM lines and SLTM lines respectively of interface 603 in response to signals from network 102-20.

The local memory module 500 retains the requester I.D. signals which it returns to SIU 100 as steering information with the data read. The local memory module 500 responds by switching the ZIR line to a binary ZERO. This enables the SIU 100 to disable the requester path. The local memory module 500 initiates the transfer of data to SIU 100 by forcing the RDTR line to a binary one in addition to placing the requester I.D. originating from multiplexer 300 and a double precision signal on the RIFM lines and the DPFM line respectively of interface 603.

The SIU 100 responds to the switching of the RDTR line by forcing the RDAA line to a binary ONE as shown in FIG. 11. This signals the local memory module 500 that the path to requester module 300 is open and to proceed with the data transfer. The signal to the RDAA line alos causes the module 500 to place a second data word on interface 603 at the trailing edge of the clock plse following the receipt of the signals on the RDAA line. At the completion of the operation, as soon as the module 500 is ready to accept another command, it switches the ZIR line to a binary ONE.

At the time of forcing the RDAA line, the SIU 100 notifies the requesting multiplexer module 300 that a data word is being applied to its DFS lines by forcing the ARDA line to a binary ONE. The SIU 100 also applies the requester ID signals to the MIFS which results in the storage of the signals in register 301-68. The I.D. contents of register 301-68 applied to the circuits 301-48 are decoded and cause the selection of the appropriate channel registers in addition to enabling channel CAO via a CAO select line. The first data word is loaded into the H register 301-40 via driver circuits 301-3. From there, the contents are loaded into the DT register of channel CAO via the H register position of switch 301-42 and the H register position of CW switch 301-44. The second data word which is applied a clock pulse following the first word is loaded into register 301-42 and thereafter transferred to the DA register 301-40 of channel CAO.

As mentioned previously, the signals from the circuits 301-48 establish the row of channel registers being selected (i.e., CAO). Also, when the multiplexer 300 responds to the list request of channel CAO, the circuits 301-48 generate a signal which causes the CAO channel circuits to reset a list flip-flop (not shown) to a binary ZERO. At that time, the circuits 302-7 force to a binary ONE state a channel busy flip-flop, not shown, which can be considered as a further control flip-flop. This in turn applies a binary ONE signal to the channel busy line of the CAI of controller adapter 303 signalling it that the channel is ready for the transfer.

As previously mentioned, the formats of the two data wores of the DCW loaded into the DT and DA registers are as shown in FIG. 10a. Since processor 200 desires access to the data requested by multiplexer 300 following its transfer, the operating system is operative to have bit 45 of the DA word of the DCW set to a binary ZERO. This causes the multiplexer 300 to generate a ZAC memory command which has cache bypass bit 9 set to a binary ZERO.

During operation, the circuits 301-4 cause the DA position of the C switch 301-50 to be selected as the source of signals for loading the last three positions of the ZAC register of bank 301-64 and the steering register 301-60. Hence, bit position 9 of the ZAC register is set to a binary ZERO. The loading proceeds via the zone/CMD switch position of the ZAC switch 301-61, the DT switch 301-20 and the steering switch 301-59. Also, the first two bit positions of register 301-65 are loaded with ZEROS identifying channel CAO as the requester.

At that time, the AOPR line is forced to a binary ONE. During the same interval, during the second clock pulse following channel selection, the address (DA) is incremented by two by adder network 301-52 and returned to the DA register via the update position of the CW switch 301-44. Next, the DT register position of C switch 301-50 is selected, the data tally contents are applied to adder network 301-52, decremented by 2 and returned to the DT register via switch 301-44.

A signal sequence similar to that described above, is initiated for transfer by SIU 100 of the ZAC command having the format of FIG. 7c (i.e., the AOPR line is forced to a binary ONE when ZAC register is loaded).

It will be appreciated that the local memory module 500 in response to the ZAC command is operative to read out the data word(s) requested from backing store 500-40 and at the same time store a block of information into cache 500-20 in the manner described above. This makes the information readily available for processor 200.

From the above, it is seen how the different command modules are able to control on a command basis which information read from backing store 500-40 is to be loaded into cache 500-20 for enabling fast access with respect thereto. By having each command include a separate and independent bit whose state defines whether cache 500-20 is to be loaded, this facilitates command decoding and the performance of other operations involving the alteration of such bit.

It will be appreciated that many modifications may be made to the preferred embodiment of the present invention as for example, the manner in which commands are formatted and coded as well as the manner in which certain control and timing signals are generated. For the sake of simplicity, in many instances, a single source of the various signals was indicated. However, it will be appreciated that the same signals may be independently generated by other sources for reducing timing restrictions.

While in accordance with the provisions and statutes there has been illustrated and described the best forms of the invention known, certain changes may be made to the system described without departing from the spirit of the invention as set forth in the appended claims and, in some cases, certain features of the invention may be used to advantage without a corresponding use of other features.

What is claimed is:

1. An input/output system for controlling input/output operations involving data transfers between a plurality of modules and a plurality of input/output devices, said system comprising:

system interface means having a plurality of ports;
 a plurality of modules each connected to a different one of said plurality of ports, said modules including at least one memory module and a plurality of command modules, each of said command modules including:
 command generating means for generating memory commands, a first type of memory command including at least a predetermined bit coded to designate first and second categories for accessing information stored in said memory module; and,
 said one memory module including:
 a cache store operatively connected to one of said ports for storing blocks of information previously fetched from a backing store included in said memory module in response to certain ones of said memory commands;
 said backing store operatively connected to said one of said interface ports, said backing store storing information words; and,
 control circuit means connected to said cache store and to said backing store for controlling the operation of said cache store and backing store, said control circuit means including:
 input register means connected to said one port for receiving said memory commands from said plurality of command modules; and,
 command decode circuit means connected to said input register means for decoding said commands, said decode circuit means including means which is responsive to said first type of memory command for generating control signals for enabling said backing store so as read out information specified by said first type of memory command in the absence of said accessed information being stored in said cache store and for generating control signals enabling said cache store to write therein said accessed information which is read out from said backing store only when said predetermined bit is coded to designate said first category.

2. The system of claim wherein each of said first type of said memory commands is coded to include a command portion, a category portion and an address portion, said command portion being coded to specify a read operation, said address portion being coded to specify the address of the information requested and said category portion including said coded predetermined bit.

3. The system of claim 2 wherein said predetermined bit is coded as a binary ZERO and said control circuit means is thereby conditioned to generate said control signals for enabling said cache store to write therein said information.

4. The system of claim 2 wherein said predetermined bit is coded as a binary ONE and said control circuit means is thereby inhibited from generating said control signals for enabling said cache store to write therein said information thereby bypassing said cache store.

5. The system of claim 2 wherein said command modules includes at least one input/output processing unit, said command generating means of said processing unit including:

microprogrammed control means for storing sequences of microinstruction words for generating control signals required for generating said memory commands; and, address control means for generating address information included as said address portion of each of said memory commands.

6. The system of claim 5 wherein said backing store includes a plurality of storage locations for storing a plurality of tables, a first table for storing a list of data control words used for referencing information in said backing store and a second table for storing list pointer words for referencing said data control words, a predetermined bit position of each of said data control words and each of said list pointer words being coded to specify when said cache store is to be bypassed and wherein said plurality of said command modules further includes a multiplexer module having a plurality of adapter ports coupled to said plurality of input/output devices, said command generating means comprising:

a plurality of registers arranged for storing address and control information pertinent to the processing of said input/output operations;

a first one of said plurality of registers being connected to receive commands from said input/output processing unit;

control means for controlling the operation of said multiplexer module in response to said commands, said control means being coupled to said plurality of registers; and, output register means coupled to said plurality of registers, said control means in response to a first command from said processing unit being operative to generate signals for storing in a second one of said plurality of registers signals corresponding to one of said list pointer words read from said second table and said control means in response to a second command from said processing unit generating signals of a first one of said first type of memory commands, said signals conditioning said second one of said plurality of registers to load said output register with the list pointer word contents to be used in referencing a first one of said data control words from said first table.

7. The system of claim 6 wherein said list pointer word contents includes said category portion and said address portion of said first one of said first type of memory command, said predetermined bit of said category portion being coded as a binary ONE for inhibiting said control circuit means of said memory module from writing signals corresponding to said data control words read from said backing store into said cache store.

8. The system of claim 7 wherein each of said data control words includes a data tally word and data address word, said signals generated in response to said second command conditioning third and fourth ones of said plurality of registers respectively for storing said data tally and data address words of a first data control word and said control means being operative to generate signals of a second one of said first type of memory command, said signals conditioning said fourth register to load said output register with said data address contents for referencing information stored in said backing store during said input/output operations.

9. The system of claim 8 wherein said data address word contents includes said category portion and said address portion of said second one of said first type of memory command, said predetermined bit of said category portion beig coded as a binary ZERO for enabling said control circuit means of said memory module to write signals corresponding to said information into said cache store providing fast access to said information by said input/output processing unit.

10. The system of claim 2 wherein said memory module further includes:

a directory having a plurality of storage locations for storing a plurality of addresses, each address for designating the location in said cache store where a particular block of information is stored;

comparison circuit means coupled to receive a first group of bits of said address portion of each of said first types of said memory commands for comparison with the address contents of one of said plurality of storage locations of said directory designated by a second group of bits of said address portion, said comparision circuit means generating signals for indicating when the information being accessed by said memory command has been stored in said cache store; and, hit register means coupled to said comparision circuit means, said hit register means being conditioned by said signals to generate an output signal used for indicating said absence of said information in said cache store.

11. The system of claim 10 wherein said control circuit means further includes directory write enable circuit means coupled to said command decode circuit means and to said hit register means, said write enable circuit means being conditioned by said command decode circuit means in response to said output signal to generate directory write clocking signals, said directory in response to said write clocking signals storing representative of said first group of bits of said address portion into said one of said directory locations designated by said second group of bits enabling subsequent access to said information from said cache store.

12. The system of claim 11 wherein said control circuit means further includes cache write enable circuit means coupled to said command decode circuit means and to said hit register means, said cache write enable circuit means being conditioned by said command decode circuit means in response to said output signal to generate write clocking signals, said cache store in response to said write clocking signals storing said information read out from said backing store.

13. The system of claim 12 wherein said backing store includes a plurality of word locations and wherein said control circuit means further includes backing store request circuit means coupled to said command decode circuit means and to said hit register means, said request circuit means being conditioned by said command decode circuit means in response to said output signal to generate a request signal for conditioning said backing store to read out the word contents of a group of said plurality of word locations corresponding to a block of information.

14. The system of claim 13 wherein said memory module further includes data output switching means coupled to said one of said plurality of ports, said backing store, said command decode circuit means and to said backing store request circuit means, and said backing store request circuit means including enabling gating means, said enabling gating means in response to said output signal conditioning said data output switching means for transfer of the word contents of said group of said plurality of word locations to the command module which generated the memory command concurrent with the writing of said word contents of said block into said cache store.

15. The system of claim 14 wherein said command decode circuit means includes means coupled to said input register means for applying predetermined bits of said address portion of said memory command to said data output switching means for selecting which words of said group are to be transferred to said command module which generated said memory command.

16. The system of claim 15 wherein said cache write enable circuit means includes address gating means coupled to said command decode means, said input register means, to said cache store and to said backing store, said address gating means in response to a predetermined address bit from said input register means being operative to modify the state of said predetermined address bit to enable all of the words of said group to be written into said cache store upon receipt from said backing store.

17. An input/output system for processing input/output data transfer operations involving any one of a plurality of peripheral devices and a memory module, said system comprising:
a processor module including means for generating memory commands required for intiating said data transfer operations involving said plurality of peripheral devices, read type memory commands including a control bit coded for selectively inhibiting storage of the information requested by each of said read memory commands;
a multiplexer module coupled to said plurality of devices, said multiplexer module including means for generating memory commands during the execution of said data transfer operations, said read type memory commands including a control bit coded for selectively inhibiting storage of information requested by each of said read type memory commands;
means interconnecting each of said modules for transfer of said memory commands and data signals; and,
said memory module comprising:
a backing store for storing information words;
a cache store for selectively storing blocks of information previously fetched from said backing store in response to certain ones of said read type of memory commands; and,
control circuit means connected to said cache store and to said backing store for controlling the operation of said cache store and backing store, said control circuit means including:
input register means connected to receive said memory commands from said processor module and said multiplexer module; and,
command decode circuit means connected to said input register means for decoding said commands, said decode circuit means including means which is responsive to said read type memory command for generating control signals so as to read out said requested information from said backing store when said information was not previously stored in said cache store and for generating control signals for writing said requested information in said cache store only when said control bit of said each read type memory command is in a first non-inhibiting state, thus enabling storage of said information in said cache store to be inhibited selectively on a command basis by either said processor module or said multiplexer module.

18. The system of claim 17 wherein each of said read type of said memory commands is coded to include a command portion, a category portion and an address portion, said command portion being coded to specify a read operation, said address portion being coded to specify the address of the information requested and said category portion including said coded control bit.

19. The system of claim 18 wherein said control bit is coded as a binary ZERO and said control circuit means is thereby conditioned to generate said control signals for enabling said writing of said information in said cache store.

20. The system of claim 18 wherein said control bit is coded as a binary ONE and said control circuit means is thereby inhibited from generating said control signals for writing said information into said cache store thereby bypassing said cache store.

21. The system of claim 18 wherein said means for generating of said processing module includes:
microprogrammed control means for storing sequences of microinstruction words for generating control signals required for generating said memory commands; and,
address control means for generating address information included as said address portion of each of said memory commands.

22. The system of claim 21 wherein said backing store includes a plurality of storage locations for storing a plurality of tables, a first table for storing a list of data control words used for referencing information in said backing store and a second table for storing list pointer words for referencing said data control words, a predetermined bit position of each of said data control words and each of said list pointer words being coded to specify when said cache store is to be bypassed by said multiplexer module and wherein said multiplexer module includes a plurality of adapter ports coupled to said plurality of peripheral devices and said means for generating comprises:
a plurality of registers arranged for storing address and control information pertinent to the execution of said data transfer operations.
a first one of said plurality of registers being connected to receive commands from said input/output processing unit;
control means for controlling the operation of said multiplexer module in response to said commands, said control means being coupled to said plurality of registers; and,
output register means coupled to said plurality of registers, said control means in response to a first command from said processing unit being operative to generate signal for storing in a second one of said plurality of registers signals corresponding to one of said list pointer words read from said second table and said control means in response to a second command from said processing unit generating signals of a first read type of memory command, said signals conditioning said second one of said plurality of registers to load said output register with the list pointer word contents to be used in referencing a first one of said data control words from said first table.

23. The system of claim 22 wherein said list pointer word contents includes said category portion and said address portion of said first one of said read type of memory command, said control bit of said category portion being coded as a binary ONE for inhibiting said control circuit means of said memory module from writing signals corresponding to said data control words read from said backing store into said cache store.

24. The system of claim 23 wherein each of said data control words includes a data tally word and data address word, said signals generated in response to said second command conditioning third and fourth ones of said plurality of registers respectively for storing said data tally and data address words of a first data control word and said control means being operative to generate signals of a second one of said read type of memory command, said signals conditioning said fourth register to load said output register with said data address contents for referencing information stored in said backing store during the execution of said data transfer operations.

25. The system of claim 24 wherein said data address word contents includes said category portion and said address portion of said second one of said read type of memory command, said control bit of said category portion being coded as a binary ZERO for enabling said control circuit means of said memory module to write signals corresponding to said information into said cache store providing fast access to said information by said processor module.

26. The system of claim 18 wherein said memory module further includes:
a directory having a plurality of storage locations for storing a plurality of addresses, each address for designating the location in said cache store where a particular block of information is stored;
comparison circuit means coupled to receive a first group of bits of said address portion of each of said first types of said memory commands for comparison with the address contents of one of said plurality of storage locations of said directory designated by a second group of bits of said address portion, said comparison circuit means generating signals for indicating when the information being accessed by said memory command has been previously stored in said cache store; and,
hit register means coupled to said comparison circuit means, said hit register means being conditioned by said signals to generate an output signal used for indicating said absence of said information in said cache store.

27. An improved input/output system for sharing access to a local memory module between a plurality of command modules which are connected to different ones of a plurality of interface ports, each of said command modules including:
command generating means for generating memory commands, each type memory commands including at least a predetermined control bit coded for controlling the type of access from said local memory module; and,
said local memory module including:
a cache store section for storing blocks of information fetched from a backing store section included in said memory module in response to said memory commands;
said backing store section operatively connected to one of said interface ports, said backing store for storing words of information;
an input section coupled to said cache store section and said backing store section, and to each of said command modules through said one interface port;
an output section coupled to said cache store section, said backing store section and to each of said command modules through said one interface port; and,
a control circuit section coupled to said input section, said output section, said cache store section and to said backing store section, said control circuit section including:
means connected to said input section for receiving said memory commands; and,
command decode circuit means connected to said input means for decoding said commands, said decode circuit means including means which is responsive to said read type memory commands from said command modules for generating control signals so as to read out information words specified by said read type memory commands from said backing store section to said output section when information words are not stored in said cache store section and for generating control signals for writing said information words read from said output section into said cache store section only when said predetermined control bit is in a first state.

28. The system of claim 27 wherein each of said read type memory commands is coded to include a command portion, a category portion and an address portion, said command portion being coded to specify a read operation, said address portion being coded to specify the address of the information requested and said category portion including said coded predetermined control bit.

29. The system of claim 28 wherein said predetermined control bit is coded as a binary ZERO and said control circuit section is thereby conditioned to generate said control signals for writing said information words into said cache store section.

30. The system of claim 28 wherein said predetermined control bit is coded as a binary ONE and said control circuit section is thereby inhibited from generating said control signals for writing said information words into said cache store section thereby bypassing said cache store section.

31. The system of claim 28 wherein said command modules includes at least one input/output processing unit, said command generating means of said processing unit including:
microprogrammed control means for storing sequences of microinstruction words for generating control signals required for generating said memory commands; and,
address control means for generating address information included as said address portion of each of said memory commands.

32. The system of claim 31 wherein said backing store section includes a plurality of storage locations for storing a plurality of tables, a first table for storing a list of data control words used for referencing information words in said backing store section and a second table for storing list pointer words for referencing said data control words, a predetermined bit of each of said data control words and each of said list pointer words being coded to specify when said cache store section is to be bypassed and wherein said plurality of said command modules further includes a multiplexer module, said command generating means of said multiplexer module comprising:
- a plurality of registers arranged for storing address and control information pertinent to the processing of data transfer operations;
- a first one of said plurality of registers being connected to receive commands from said input/output processing unit;
- control means for controlling the operation of said multiplexer module in response to said commands, said control means being coupled to said plurality of registers; and,
- output register means coupled to said plurality of registers, said control means in response to a first command from said processing unit being operative to generate signals for storing in a second one of said plurality of registers signals corresponding to one of said list pointer words read from said second table and said control means in response to a second command from said processing unit generating signals of a read type memory command and said signals conditioning said second one of said plurality of registers to load said output register with said one list pointer word including said predetermined bit for referencing a first one of said data control words from said first table.

33. The system of claim 32 wherein said predetermined bit of said one list pointer word is coded as a binary ONE and wherein said control circuit section in response to said read type command bypasses said cache store section and transfers said first one of said data control words read from said backing store section to said multiplexer module.

34. The system of claim 33 wherein each of said data control words includes a data tally word and a data address word, said signals generated in response to said second command conditioning third and fourth ones of said plurality of registers respectively for storing said data tally and data address words of said first data control word and said control means being operative to generate signals of a second read type memory command, said signals conditioning said fourth register to load said output register with said data address word including said predetermined bit to reference information words stored in said backing store section during data transfer operations.

35. The system of claim 34 wherein said predetermined bit of said data address word is coded as a binary ZERO and wherein said control circuit section of said local memory module in response to said read type command is operative to write said information words read from said backing store section into said cache store section thereby providing said input/output processing unit with future fast access to said information words.

* * * * *